US012094366B2

(12) United States Patent
Fujita et al.

(10) Patent No.: US 12,094,366 B2
(45) Date of Patent: Sep. 17, 2024

(54) LABEL TO BE WRAPPED AROUND ADHEREND AND METHOD OF PRINTING AND ATTACHING THE SAME

(71) Applicant: BROTHER KOGYO KABUSHIKI KAISHA, Nagoya (JP)

(72) Inventors: Masaya Fujita, Nagoya (JP); Shiori Mizutani, Chiryu (JP); Yuki Hokari, Nagoya (JP); Chie Nakashima, Nagoya (JP); Shohei Tsuchimori, Nagoya (JP); Takaaki Banno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 159 days.

(21) Appl. No.: 17/484,511

(22) Filed: Sep. 24, 2021

(65) Prior Publication Data

US 2022/0013043 A1 Jan. 13, 2022

Related U.S. Application Data

(63) Continuation of application No. PCT/JP2020/011097, filed on Mar. 13, 2020.

(30) Foreign Application Priority Data

Mar. 26, 2019 (JP) ................................ 2019-058168

(51) Int. Cl.
*B41J 3/407* (2006.01)
*B31D 1/02* (2006.01)
(Continued)

(52) U.S. Cl.
CPC ........... *G09F 3/0288* (2013.01); *B31D 1/021* (2013.01); *B31D 1/027* (2013.01); *B41J 3/4075* (2013.01);
(Continued)

(58) Field of Classification Search
CPC .................................... G09F 3/10; G09F 3/00
See application file for complete search history.

(56) References Cited

U.S. PATENT DOCUMENTS 5,658,648 A 8/1997 Doerr et al.
10,286,693 B2 * 5/2019 Ishida .................. B41J 11/008
(Continued)

FOREIGN PATENT DOCUMENTS

CN 102099845 A 6/2011
JP S50-64981 U 10/1973
(Continued)

OTHER PUBLICATIONS

Extended European Search Report for the related European Patent Application No. 20778922.3 dated Jan. 26, 2023.
(Continued)

*Primary Examiner* — Shin H Kim
(74) *Attorney, Agent, or Firm* — KENEALY VAIDYA LLP

(57) ABSTRACT

A label is to be wrapped around an adherend after being printed. The adherend has a diameter equal to or smaller than a prescribed diameter. In the label, a base material has a printing surface. An adhesive layer is provided on an opposite side surface of the base material from the printing surface. A release material is bonded to the adhesive layer with a portion of the adhesive layer exposed. The release material has a higher stiffness than the base material. A mark for alignment is to be used when bonding together exposed sections of the adhesive layer or an exposed section of the adhesive layer with the release material in order to form the label into a loop shape. The mark is provided at a position for forming the label in the loop shape having an inner diameter greater than the prescribed diameter.

12 Claims, 28 Drawing Sheets

(51) Int. Cl.
*B41J 13/00* (2006.01)
*G09F 3/02* (2006.01)
*G09F 3/10* (2006.01)

(52) U.S. Cl.
CPC ........ *G09F 3/10* (2013.01); *G09F 2003/0201* (2013.01); *G09F 2003/0202* (2013.01); *G09F 2003/0229* (2013.01); *G09F 2003/023* (2013.01); *G09F 2003/0257* (2013.01); *G09F 2003/0269* (2013.01)

(56) References Cited

U.S. PATENT DOCUMENTS

| | | | | |
|---|---|---|---|---|
| 10,438,517 | B2 * | 10/2019 | Murayama | G09F 3/02 |
| 2004/0251165 | A1 * | 12/2004 | Girzaitis | G09B 19/00 206/534 |
| 2010/0223823 | A1 | 9/2010 | Gordon | |
| 2013/0305576 | A1 | 11/2013 | Takashima et al. | |
| 2013/0319604 | A1 * | 12/2013 | DeLise, Jr. | B31D 1/021 156/247 |
| 2014/0272289 | A1 * | 9/2014 | Savagian | G09F 3/0297 428/141 |
| 2015/0053339 | A1 * | 2/2015 | Ducharme | B32B 15/08 156/247 |
| 2015/0107140 | A1 * | 4/2015 | Henderson | G09F 3/10 40/638 |
| 2016/0217714 | A1 * | 7/2016 | Ewert | B41J 3/00 |
| 2017/0004740 | A1 | 1/2017 | Caveney et al. | |
| 2018/0281480 | A1 | 10/2018 | Ishida et al. | |
| 2018/0286292 | A1 | 10/2018 | Murayama et al. | |

FOREIGN PATENT DOCUMENTS

| | | | |
|---|---|---|---|
| JP | 2012-063446 | A | 3/2012 |
| JP | 2012-108444 | A | 6/2012 |
| JP | 2015-049479 | A | 3/2015 |
| JP | 2018-172607 | A | 11/2018 |
| JP | 2018-173614 | A | 11/2018 |
| WO | 2020/195950 | A1 | 10/2020 |

OTHER PUBLICATIONS

Office Action for the related Chinese Patent Application No. 202080024539.4 dated Apr. 6, 2023.

International Search Report and Written Opinion of the International Search Report for PCT/JP2020/011097 dated Jun. 9, 2020.

Invitation pursuant to Rule 62a (1) EPC for the related European Patent Application No. 20778922.3 dated Oct. 14, 2022.

Chinese Office Action for the related Chinese Patent Application No. 202080024539.4 dated Oct. 8, 2022.

International Preliminary Report on Patentability for PCT/JP2020/011097 dated Sep. 28, 2021.

Decision of Refusal for the related Chinese Patent Application No. 202080024539.4 dated Jul. 17, 2023.

* cited by examiner

LABEL TO BE WRAPPED AROUND ADHEREND AND METHOD OF PRINTING AND ATTACHING THE SAME

CROSS REFERENCE TO RELATED APPLICATIONS

This application is a by-pass continuation application of International Application No. PCT/JP2020/011097 filed Mar. 13, 2020 claiming priority from Japanese Patent Application No. 2019-058168 filed Mar. 26, 2019. The entire contents of the international application and the priority application are incorporated herein by reference.

TECHNICAL FIELD

The present disclosure relates to a label and a method of printing and attaching a label.

BACKGROUND

A label known in the art is fitted around a cylindrical adherend such as a cable, for example. The label in this conventional technology is provided with a layered structure including a base material, an adhesive layer, and a release material and is used by wrapping the label around an adherend to form a loop shape. Here, the user forms the label into a loop shape by bonding an exposed section of the adhesive layer with the release material or adhesive layer. In the conventional technology described above, bonding is carried out so that the inner diameter of the loop-shaped portion is approximately equivalent to the outer diameter of the adherend. Owing to the release material contacting the adherend, the label does not adhere to the adherend and is used as a rotating label.

SUMMARY

However, a user unfamiliar with this operation might leave no gap between the adherend and label when forming the label into the loop shape, making the label too tight around the adherend so that the label cannot rotate.

It is an object of the present disclosure to provide a label whose rotation relative to an adherend is unlikely to be impeded.

In order to provide the above and other objects, the present disclosure provides a label to be wrapped around an adherend after being printed. The adherend has a diameter equal to or smaller than a prescribed diameter. The label includes: a base material; an adhesive layer; a release material; and a mark for alignment. The base material has a printing surface. The adhesive layer is provided on an opposite side surface of the base material from the printing surface. The release material is bonded to the adhesive layer with a portion of the adhesive layer exposed. The release material has a higher stiffness than the base material. The mark for alignment is to be used when bonding together exposed sections of the adhesive layer or an exposed section of the adhesive layer with the release material in order to form the label into a loop shape. The mark is provided at a position for forming the label in the loop shape having an inner diameter greater than the prescribed diameter.

According to another aspect, the present disclosure also provides a label to be wrapped around an adherend after being printed. The adherend has a diameter equal to or greater than a prescribed diameter. The label includes: a base material; an adhesive layer; a release material; and a special shape for alignment. The base material has a printing surface. The adhesive layer is provided on an opposite side surface of the base material from the printing surface. The release material is bonded to the adhesive layer with a portion of the adhesive layer exposed. The release material has a higher stiffness than the base material. The special shape for alignment is to be used when bonding together exposed sections of the adhesive layer or an exposed section of the adhesive layer with the release material in order to form the label into a loop shape. The special shape is provided at a position for forming the label in the loop shape having an inner diameter greater than the prescribed diameter.

According to still another aspect, the present disclosure also provides a method of printing and attaching a label. The label includes: a base material; an adhesive layer; and a release material. The adhesive layer is provided on a first surface of the base material. The release material is bonded to the adhesive layer with a portion of the adhesive layer exposed. The release material has a higher stiffness than the base material. The method includes: a first step; a second step; and a third step. The first step is to print a second surface of the base material. The second step is to wrap the label around an adherend and to bond together exposed sections of the adhesive layer or an exposed section of the adhesive layer with the release material to form the label into a loop shape while leaving a gap between the label and the adherend. The second step is performed after the first step. The third step is to fold over the release material and to lay a protruding portion of the label protruding out from a loop-shaped portion over the second surface of the base material while reducing the gap between the label and the adherend. The third step is performed after the second step.

BRIEF DESCRIPTION OF THE DRAWINGS

The particular features and advantages of the disclosure as well as other objects will become apparent from the following description taken in connection with the accompanying drawings, in which:

FIGS. 2A through 2D are explanatory diagrams showing a detailed structure of a printing tape according to the embodiment of the present disclosure, in which: FIG. 2A is a plan view showing the printing tape in an unprinted state; FIG. 2B shows a plan view of the printing tape after a printed image has been printed with the label-creating device; FIG. 2C shows a cross-sectional view taken along a section I-I of the printed printing tape; and FIG. 2D shows a rear view of the printed printing tape;

FIGS. 3A through 3F are explanatory diagrams showing a process for separating each label from the printed printing tape according to the embodiment of the present disclosure, in which: FIG. 3A is a plan view showing the printed printing tape; FIG. 3B is a cross-sectional view of the structure shown in FIG. 3A taken along a section II-II; FIG. 3C is a rear-side view showing the printed printing tape; FIG. 3D is a plan view showing the state of the printed printing tape after a single label has been peeled off; FIG. 3E is a cross-sectional view of the structure shown in FIG. 3D taken along a section III-III; and FIG. 3F is a rear-side view of the printed printing tape after the single label has been peeled off;

FIGS. 4A and 4B are explanatory diagrams showing a detailed structure of the label separated from the printing tape according to the embodiment of the present disclosure, in which: FIG. 4A shows a plan view of a single label; and FIG. 4B shows a cross-sectional view of the structure shown in FIG. 4A taken along a section IV-IV;

FIGS. 5A and 5B are explanatory diagrams showing a procedure for attaching the label to an adherend according to the embodiment of the present disclosure, in which: FIG. 5A is a diagram explaining a state prior to a second step of the procedure; and FIG. 5B is a diagram explaining the second step of the procedure through a cross section in a plane perpendicular to an axial direction of the adherend when the label is formed in a loop shape around the adherend;

FIGS. 6A and 6B are explanatory diagrams showing the procedure for attaching the label to the adherend according to the embodiment of the present disclosure, in which: FIG. 6A is a diagram explaining the second step of the procedure through a schematic perspective view when the label is formed in a loop shape around the adherend; and FIG. 6B is another diagram explaining the second step of the procedure through a schematic perspective view when the label is formed in a loop shape around the adherend;

FIGS. 7A through 7C are explanatory diagrams showing the procedure for attaching the label to the adherend according to the embodiment of the present disclosure, in which: FIG. 7A is a first diagram explaining a third step through a cross section in a plane perpendicular to the axial direction of the adherend; FIG. 7B is a second diagram explaining the third step through the cross section shown in FIG. 7A; and FIG. 7C is a third diagram explaining the third step through the cross section shown in FIGS. 7A and 7B;

FIGS. 8A through 8D are explanatory diagrams showing the procedure for attaching the label to the adherend according to the embodiment of the present disclosure, in which: FIG. 8A is a first diagram explaining the third step with a schematic perspective view when a gap between the label and the adherend is reduced; FIG. 8B is a second diagram explaining the third step with a schematic perspective view when the gap between the label and the adherend is further reduced; FIG. 8C is a third diagram explaining the third step with a schematic perspective view when a protruding portion of the label is to be wrapped around the adherend; and FIG. 8D is a fourth diagram explaining the third step with a schematic perspective view when the protruding portion of the label is wrapped around the adherend;

FIGS. 10A and 10B are schematic diagrams showing an attached state of the label on a cable, in which: FIG. 10A shows a sample state in which the printed image is facing the viewer of the drawing; and FIG. 10B shows another sample state in which the printed image is not facing the top of the drawing;

FIGS. 11A and 11B are explanatory diagrams showing a detailed structure of a label separated from a printing tape according to a first variation of the embodiment, in which: FIG. 11A shows a plan view of a single label; and FIG. 11B shows a cross-sectional view of the structure shown in FIG. 11A taken along a section V-V;

FIGS. 12A and 12B are explanatory diagrams showing a procedure for attaching the label to an adherend according to the first variation, in which: FIG. 12A is a diagram explaining a state prior to a second step of the procedure; and FIG. 12B is a diagram explaining the second step of the procedure through a cross section in a plane perpendicular to an axial direction of the adherend when the label is formed in a loop shape around the adherend;

FIGS. 13A and 13B are explanatory diagrams showing a detailed structure of a label separated from a printing tape according to a second variation of the embodiment, in which: FIG. 13A shows a plan view of a single label; and FIG. 13B shows a cross-sectional view of the structure shown in FIG. 13A taken along a section VI-VI;

FIGS. 14A through 14F are explanatory diagrams showing a process for separating each label from a printed printing tape according to a third variation of the embodiment, in which: FIG. 14A is a plan view showing the printed printing tape; FIG. 14B is a cross-sectional view of the structure shown in FIG. 14A taken along a section VII-VII;

FIG. 14C is a rear-side view showing the printed printing tape; FIG. 14D is a plan view showing the state of the printed printing tape after a single label has been peeled off; FIG. 14E is a cross-sectional view of the structure shown in FIG. 14D taken along a section VIII-VIII; and FIG. 14F is a rear-side view of the printed printing tape after the single label has been peeled off;

FIGS. 15A through 15F are explanatory diagrams showing a process for separating each label from a printed printing tape according to a fourth variation of the embodiment, in which: FIG. 15A is a plan view showing the printed printing tape; FIG. 15B is a cross-sectional view of the structure shown in FIG. 15A taken along a section IX-IX;

FIG. 15C is a rear-side view showing the printed printing tape; FIG. 15D is a plan view showing the state of the printed printing tape after a single label has been peeled off; FIG. 15E is a cross-sectional view of the structure shown in FIG. 15D taken along a section X-X; and FIG. 15F is a rear-side view of the printed printing tape after the single label has been peeled off;

FIGS. 16A and 16B are explanatory diagrams showing a detailed structure of a label separated from a printing tape according to a fifth variation of the embodiment, in which: FIG. 16A shows a plan view of a single label; and FIG. 16B shows a cross-sectional view of the structure shown in FIG. 16A taken along a section XI-XI; and FIGS. 17A and 17B are explanatory diagrams showing a procedure for attaching the label to an adherend according to the fifth variation, in which: FIG. 17A is a diagram explaining a second step of the procedure through a schematic perspective view when the label is formed in a loop shape around the adherend; and FIG. 17B is another diagram explaining the second step of the procedure through a schematic perspective view when the label is formed in a loop shape around the adherend.

DETAILED DESCRIPTION

Figure 1:
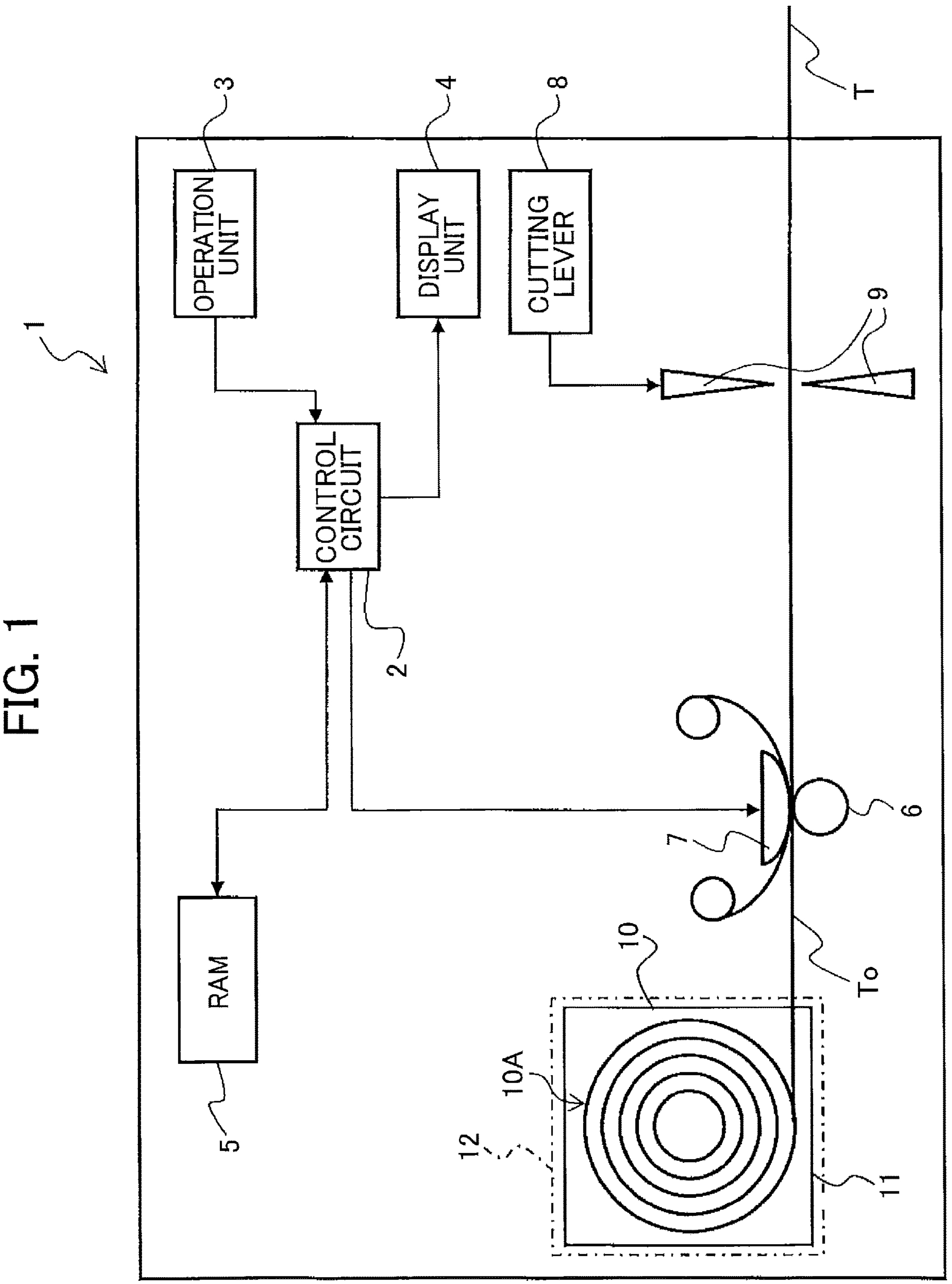
FIG. 1 is an explanatory diagram showing a schematic configuration of a label-creating device according to an embodiment of the present disclosure.

Below, one embodiment of the present disclosure will be described in detail while referring to the accompanying drawings. In general, components having essentially the same functions are designated with the same reference numerals in the following specification and the drawings. Duplicate descriptions of such components are omitted accordingly.

<Label-Creating Device>

First, the functional configuration of a label-creating device according to an embodiment of the present disclosure will be described with reference to FIG. 1.

In FIG. 1, a label-creating device 1 (also called a printing device) has a control circuit 2, an operation unit 3 on which a user (also called an operator) can perform desired operations, a display unit 4 for displaying prescribed information, a RAM 5 for storing various types of information, a conveying roller 6 (also called a conveying unit), a print head 7 (also called a printing unit), a cutting lever 8, and a cutter 9.

A cartridge holder 12 is provided in the label-creating device 1. A tape cartridge 10 is detachably mounted in the cartridge holder 12. The tape cartridge 10 has a housing 11 that accommodates a tape roll 10A (depicted as concentric circles for simplification, but actually wound into a roll). A printing tape To (also called a tape and a long medium) is wound into the tape roll 10A. Here, the tape cartridge 10 may be a die-cut label type or a continuous length type. In the die-cut label type, a printing tape To having cuts HC (described later with reference to FIGS. 2A through 2D) formed by half-cutting the printing tape To is wound about the tape roll 10A. In the continuous length type, a printing tape To having no cuts HC is wound about the tape roll 10A. Either type of tape cartridge 10 can be used in the label-creating device 1. Unless otherwise stated, the following example describes a case of using the die-cut label type tape cartridge 10.

The control circuit 2 is provided with a CPU and a ROM not shown in the drawings. The control circuit 2 executes various programs pre-stored in the ROM while utilizing the temporary storage function of the RAM 5 in order to perform overall control of the label-creating device 1.

The conveying roller 6 is disposed in opposition to the print head 7. The printing tape To paid out from the tape roll 10A is interposed between the conveying roller 6 and print head 7. By rotating, the conveying roller 6 conveys the printing tape To while pulling the printing tape To from the tape roll 10A.

The print head 7 prints desired print objects (see printed images R described later) on individual label parts (described later in greater detail) of the printing tape To conveyed by the conveying roller 6. The print objects are user-specified characters, icons, and the like.

When actuated through a user operation on the cutting lever 8, the cutter 9 cuts off a printed section of a printing tape T (described later in greater detail) having a plurality of labels L formed along the conveying direction.

<Detailed Structure of the Printing Tape>

Figure 2A:
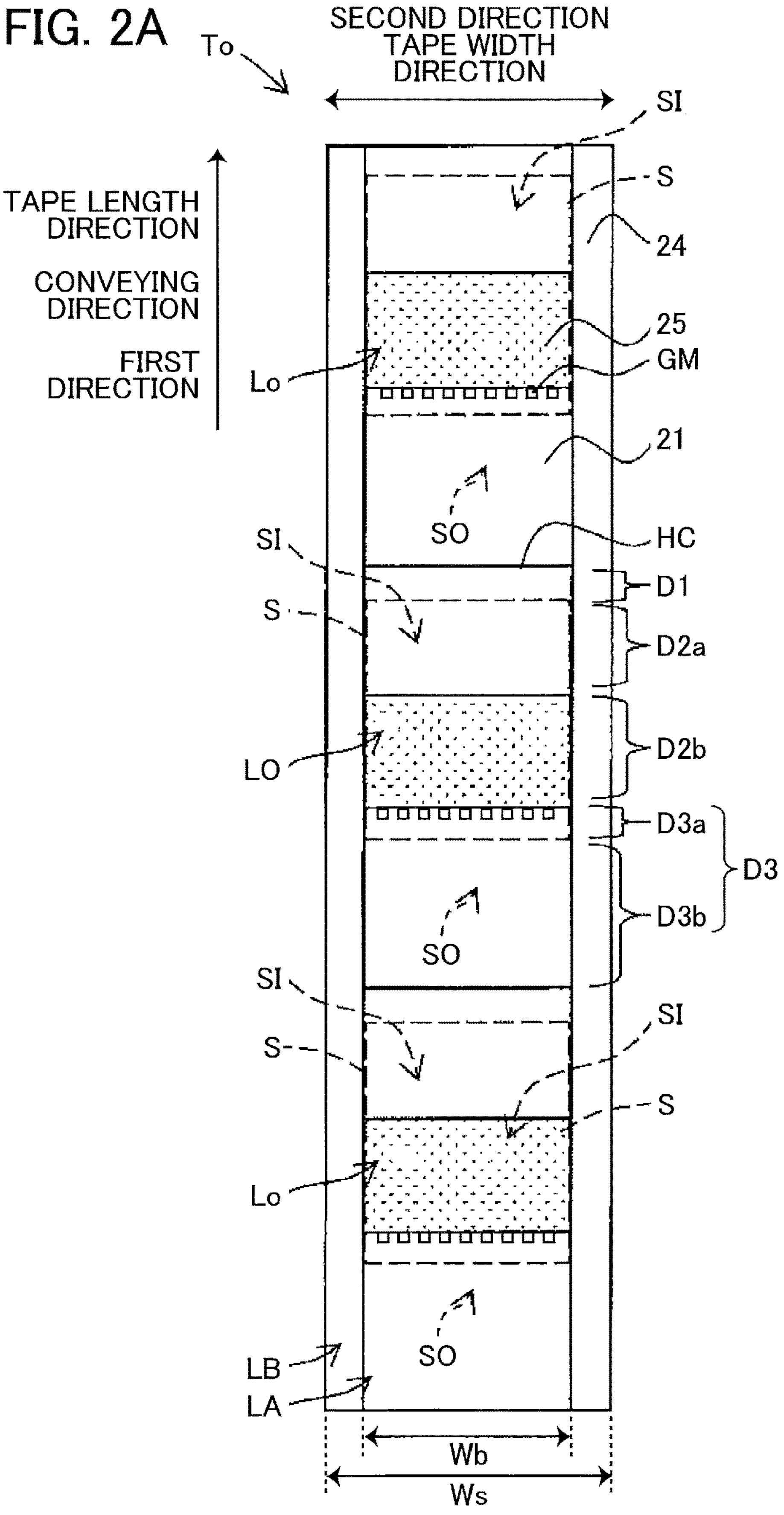
Figure 2B:
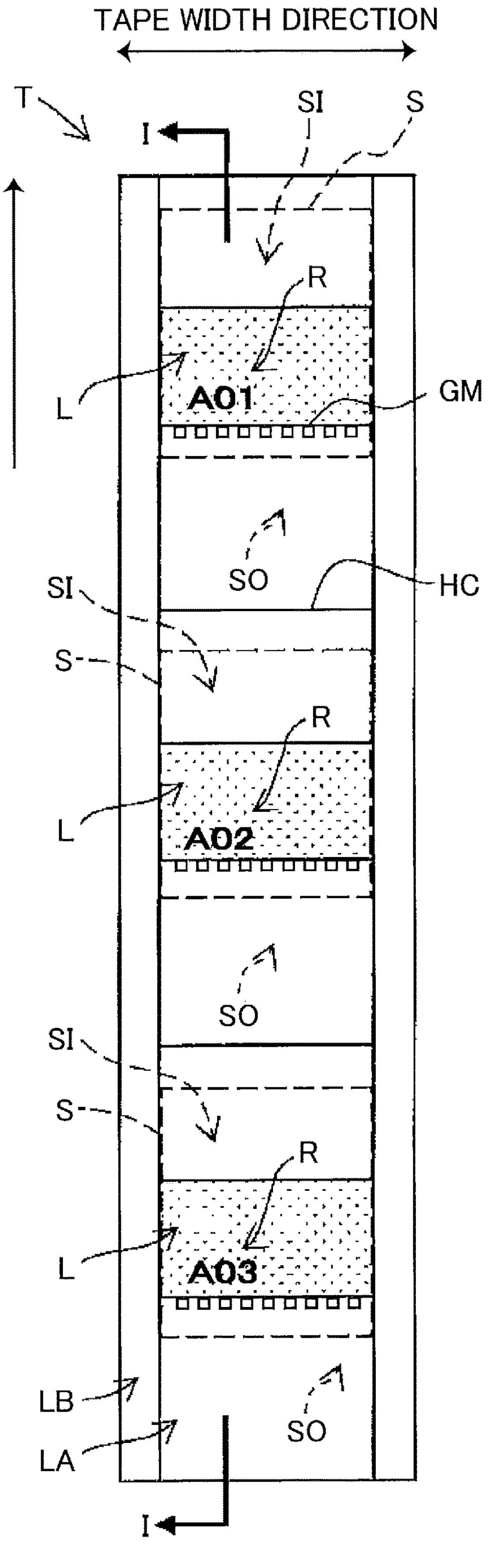
Figure 2C:
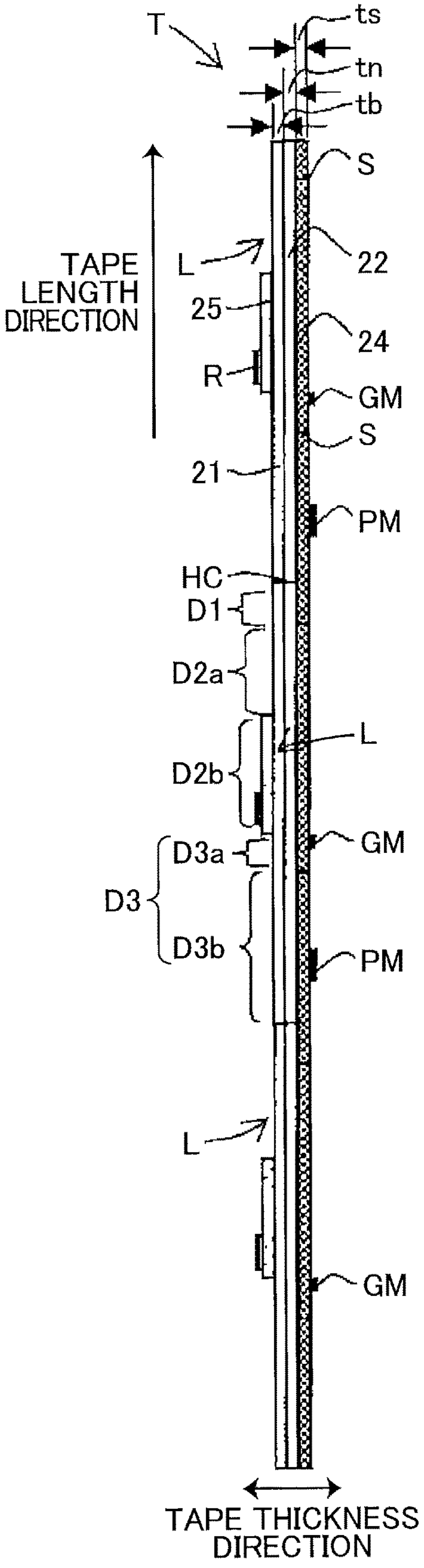
Figure 2D:
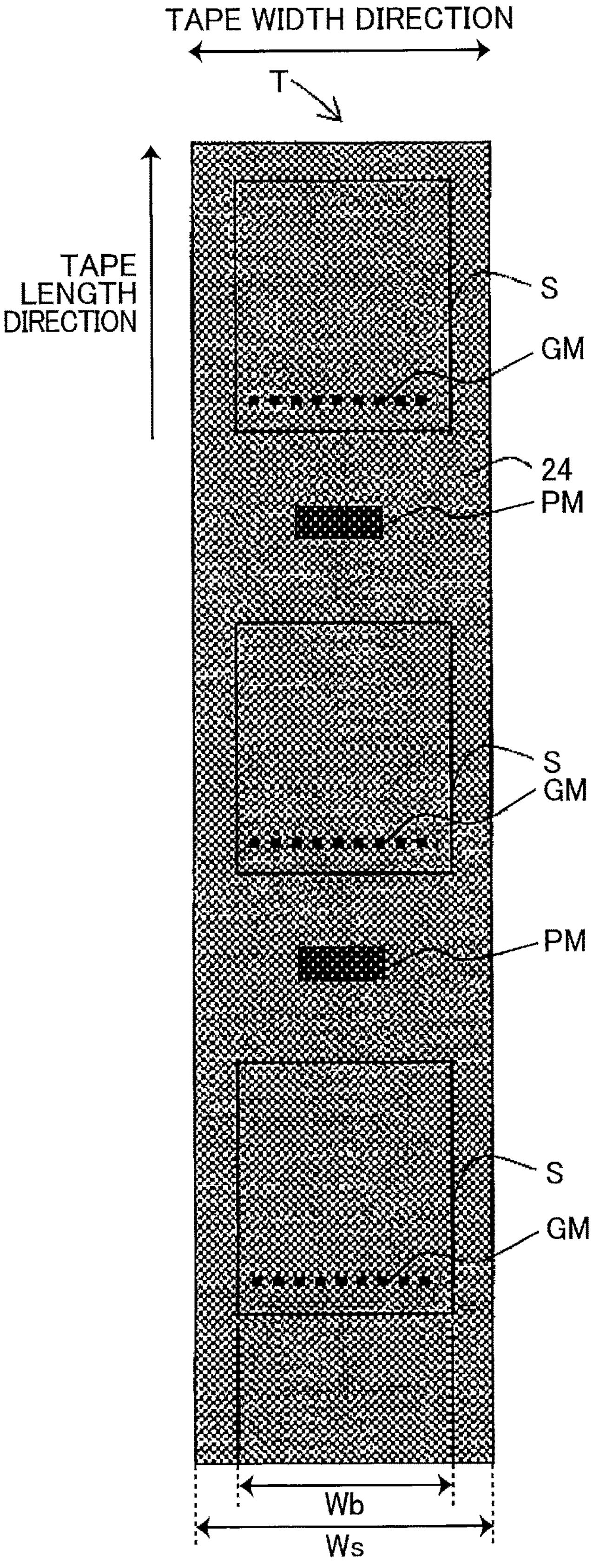

FIGS. 2A through 2D show a detailed structure of the printing tape To. FIG. 2A is a plan view showing the printing tape To in an unprinted state. The up-down direction in the drawing constitutes the conveying direction (also called the tape length direction and the first direction), the left-right direction in the drawing constitutes the tape width direction (also called the second direction), and the near-far direction in the drawing constitutes the tape thickness direction. Further, FIG. 2B shows a plan view of the printing tape T after the printed image R has been printed with the label-creating device 1, FIG. 2C shows a cross-sectional view taken along a section I-I of the printed printing tape T, and FIG. 2D shows a rear view of the printed printing tape T.

As shown in FIGS. 2A through 2D, the printing tape To includes a transparent base material 21, a transparent adhesive layer 22, and a transparent release material 24 that are layered in this order from the left side to the right side in FIG. 2C (from the near side to the far side in FIGS. 2A and 2B) along the tape thickness direction (the depth direction when viewing FIGS. 2A, 2B, and 2D and the left-right direction in FIG. 2C; that is, the direction in which each layer is laminated, as will be described later). Note that all of the base material 21, adhesive layer 22, and release material 24 may be provided with a semitransparent color. Further, the release material 24 may be opaque.

At this time, a printing surface 25 (also called a print background layer) is partially provided on the front-side (the left side in FIG. 2C; hereinafter called the "first side in the thickness direction" for convenience) surface of the base material 21. The printing surface 25 is provided with a suitable non-transparent color and is the surface on which the print head 7 forms the printed image R. Note that the adhesive layer 22 may be provided over part of the surface, rather than the entire surface, on the back side (the right side in FIG. 2C; hereinafter called the "second side in the thickness direction" for convenience) of the base material 21, i.e., between the base material 21 and the release material 24.

In the printing tapes To and T having the layered structure described above, a plurality of label parts Lo (or labels L configured of printed images R formed on the label parts Lo) is arranged successively in the tape length direction (the up-down direction in the drawings) while interposed by cuts HC extending along the tape width direction. The base material 21 is aligned in the vertical direction in the drawings, i.e., the first direction, perpendicular to the thickness direction in correspondence with the plurality of cuts HC (in correspondence with slits S described later). In other words, the base material 21 is divided by half-cut-type cuts HC into a label portion LA and a non-label portion LB and is bonded via the adhesive layer 22 to the surface of the release material 24 on the first side of the thickness direction.

Owing to the layered structure described above, each label part Lo has four areas: an adhesive area D1 (also called the first area) constituting the end portion on the upper side of the drawings along the first direction (also called the second side of the first direction), a non-adhesive area D2*a* (also called the second area) provided adjacent to the adhesive area D1 on the lower side in the drawings (also called the first side of the first direction), a non-adhesive area D2*b* (also called the second area together with the non-adhesive area D2*a*) provided adjacent to the non-adhesive area D2*a* on the lower side in the drawings, and a partial adhesive area D3 (also called the third area) provided adjacent to the non-adhesive area D2*b* on the lower side in the drawings. The partial adhesive area D3 is provided with a non-adhesive area D3*a* (also called the first partial area) provided adjacent to the non-adhesive area D2*b* on the lower side in the drawings, and an adhesive area D3*b* (also called the second partial area) provided adjacent to the non-adhesive area D3*a* on the lower side in the drawings.

At this time, a width Ws of the release material 24 in the second direction is greater than a width Wb of the base material 21 in the left-right direction (the second direction). Further, a thickness dimension ts of the release material 24 is smaller than a thickness dimension tb of the base material 21 and a thickness dimension tn of the adhesive layer 22.

As shown in FIG. 2D, (half-cut) rectangular slits S (also called break lines) having substantially the same length in the second direction as the base material 21 are provided in the release material 24. These slits S are arranged such that the adhesive area D1 and adhesive area D3*b* of each slit S are positioned in a slit outer area SO outside the slit S in a plan view, while the non-adhesive area D2*a*, non-adhesive area D2*b*, and non-adhesive area D3*a* of each slit S are positioned in a slit inner area SI inside the slit S (a rectangular area having the same width dimension as the base material 21) in a plan view. As a result, the rectangular slits S are juxtaposed along the up-down direction in the drawings (the first direction) and the printing surfaces 25 are positioned within the slit inner areas SI enclosed by the slits S in the printing tapes To and T. A printed image R is formed on the printing surface 25 of each label L. In this example, the printed images R are print objects configured of the text "A01," "A02," "A03," . . . .

As shown in FIG. 2D, marks PM are provided on the release material 24 in intermediate parts between two neighboring slits S for positioning control when the conveying roller 6 conveys the printing tape To. That is, the label-creating device 1 is provided with a well-known reflective optical sensor (not shown) having a light-emitting unit and a light-receiving unit. During positioning control, the optical sensor emits light from the light-emitting unit while the light-receiving unit receives light reflected off the release material 24. The marks PM on the release material 24 are detected based on the difference in the amount of light received between portions of the release material 24 on which the marks PM are provided and all other portions at this time, and the printing tape To is positioned based on these detections. As shown in FIG. 2D, marks GM are further provided on the release material 24 inside the slits S. These marks GM will be described later.

<Separating Labels by Peeling>

Figure 3A:
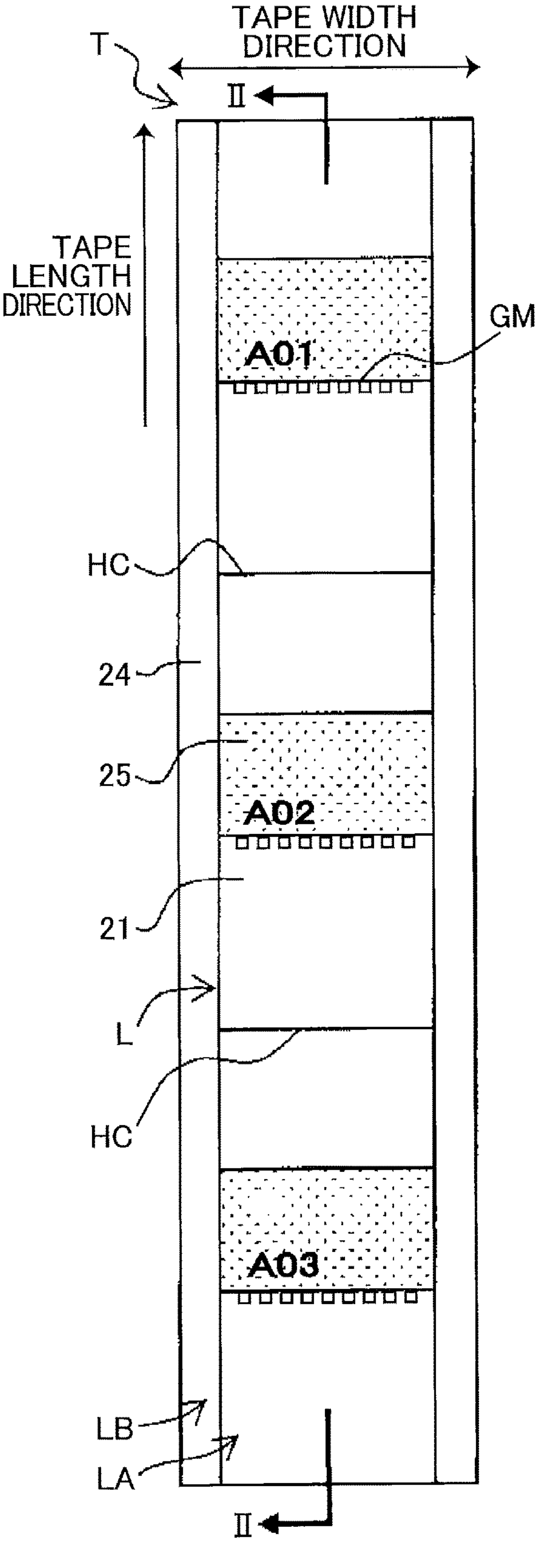
Figure 3B:
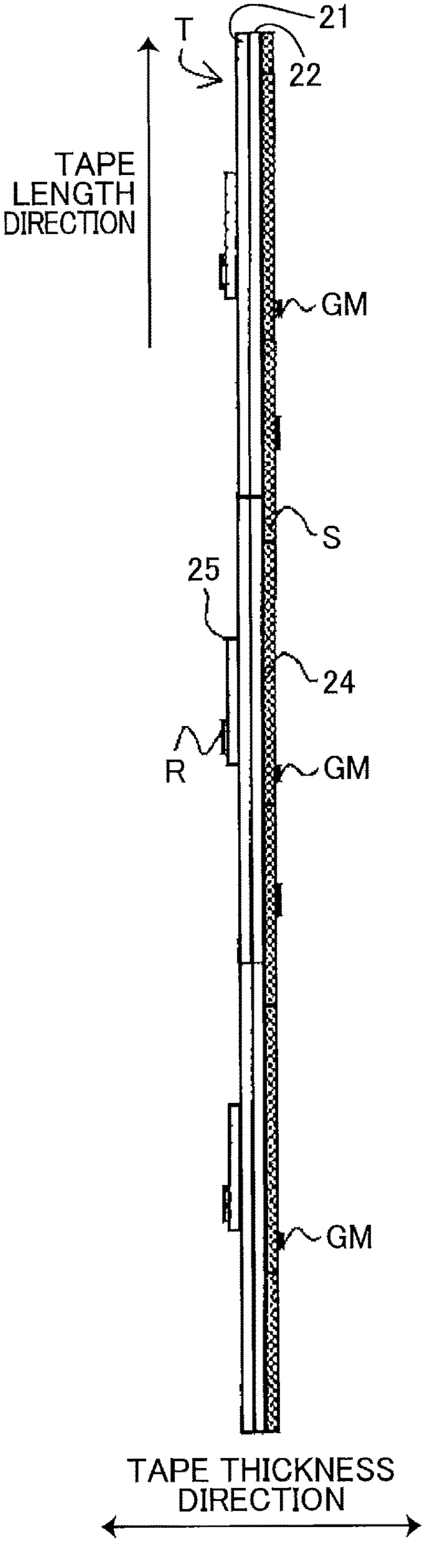
Figure 3C:
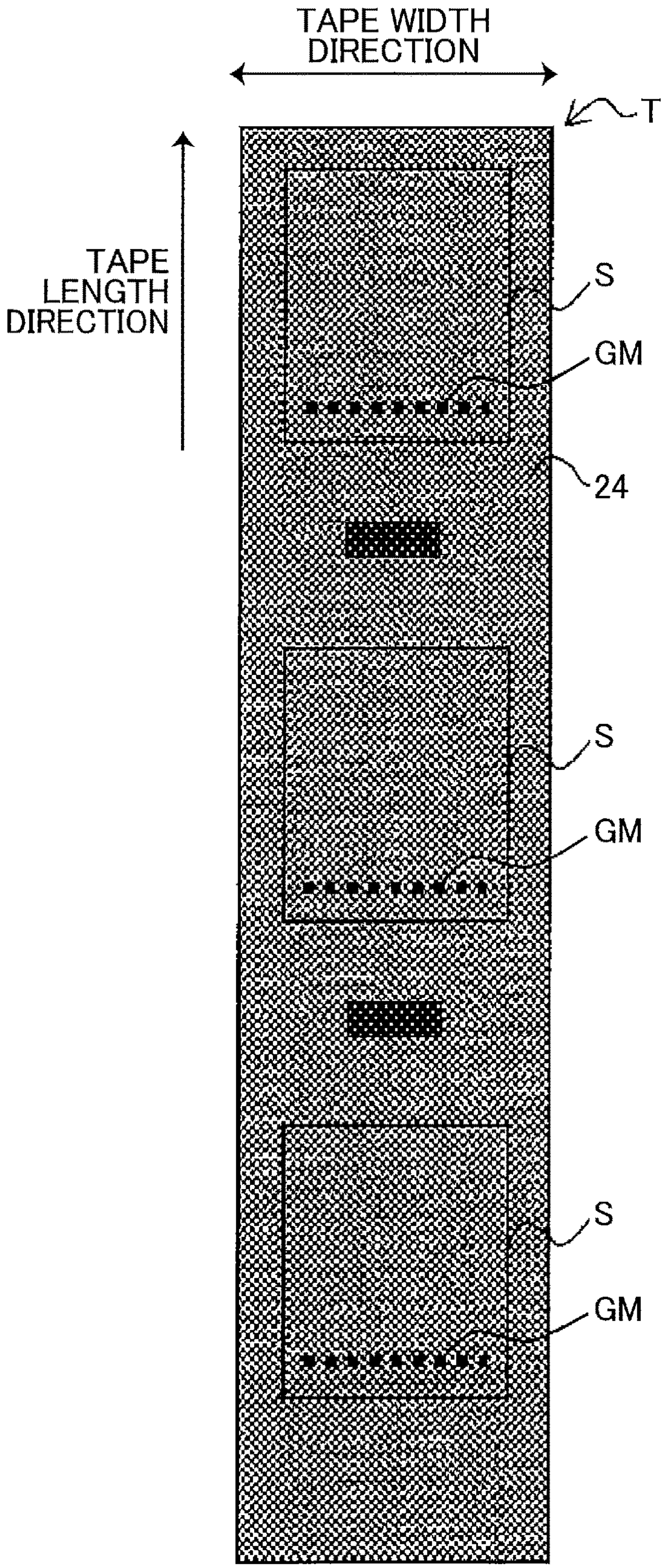
Figure 3D:
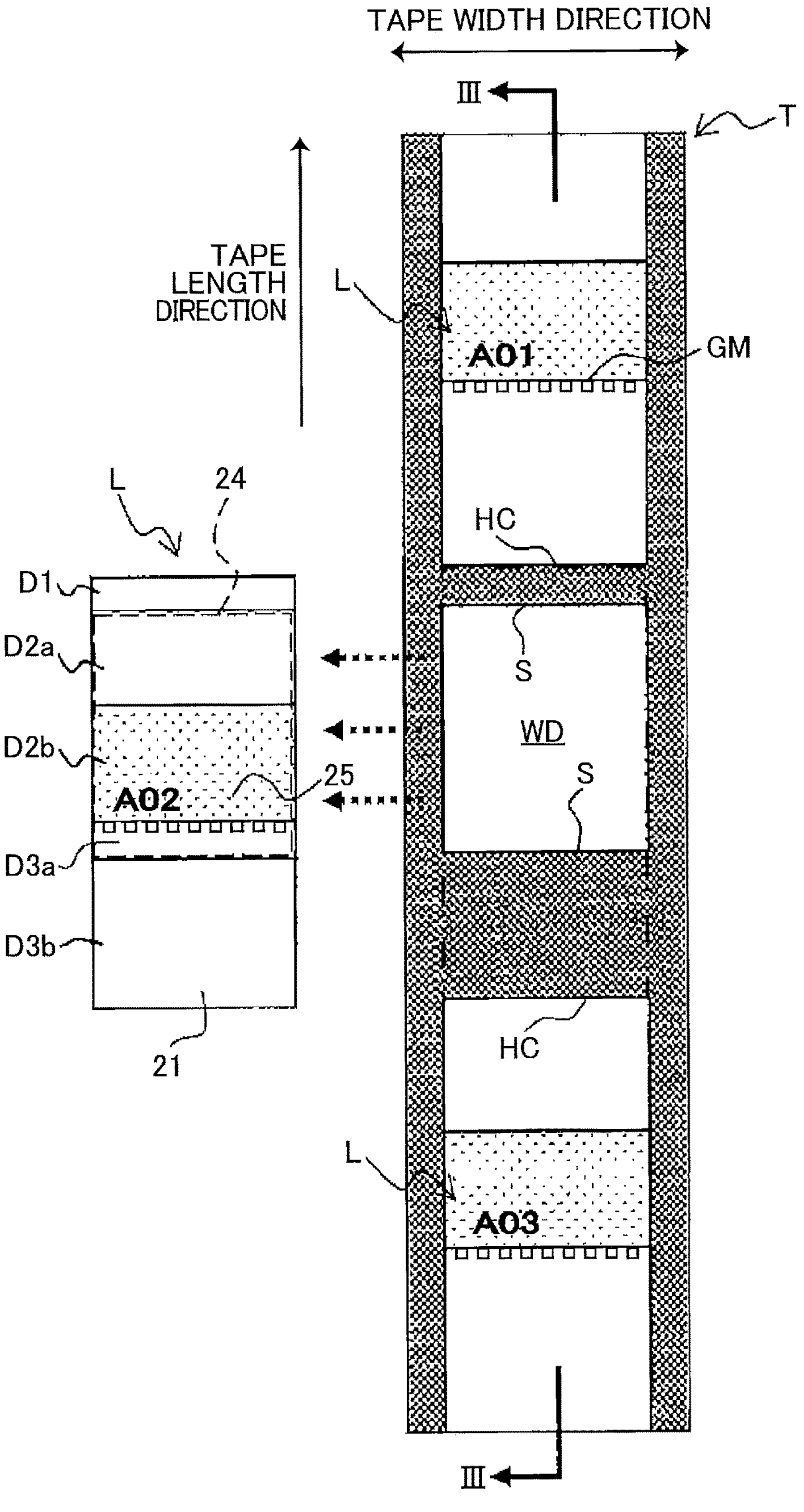
Figure 3E:
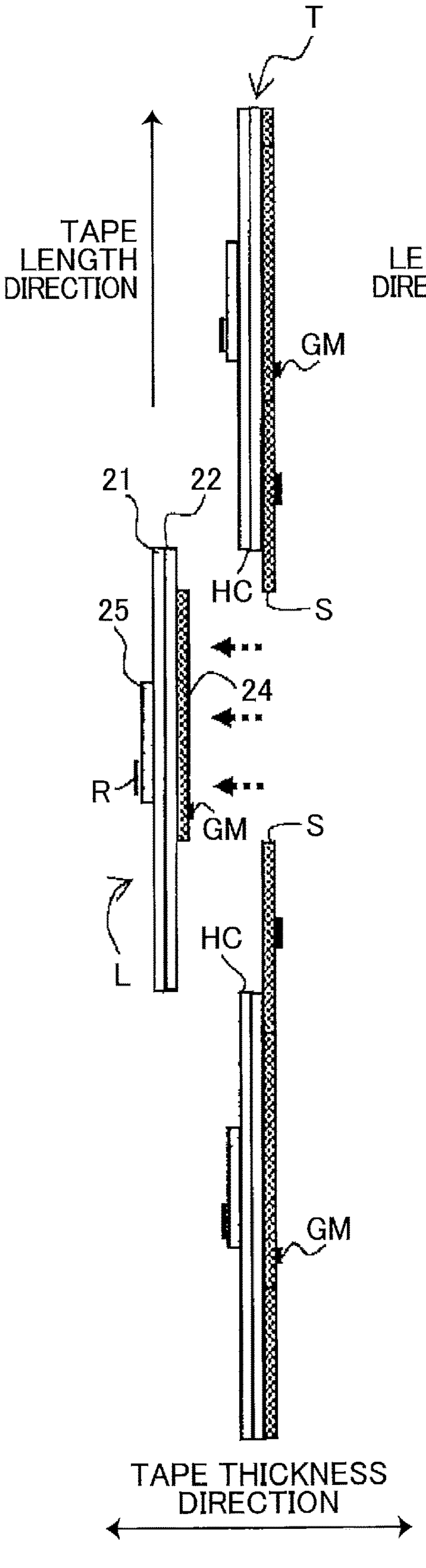
Figure 3F:
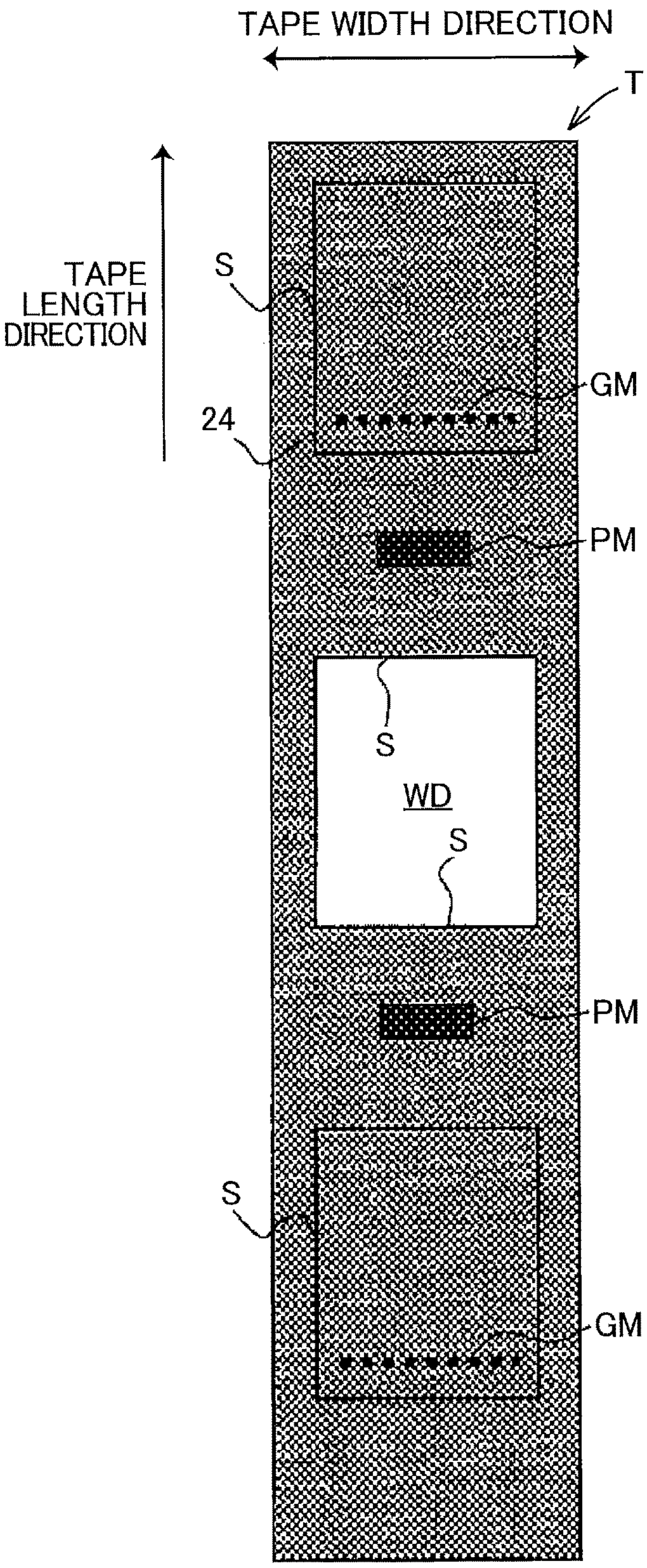

FIGS. 3A through 3F show the process for separating each label L from the printing tape T after printing. FIG. 3A is a plan view showing a printed printing tape. FIG. 3B is a cross-sectional view of the structure shown in FIG. 3A taken along the section II-II. FIG. 3C is a rear-side view showing the printed printing tape. FIG. 3D is a plan view showing the state of the printed printing tape after one label has been peeled off. FIG. 3E is a cross-sectional view of the structure shown in FIG. 3D taken along the section III-III. FIG. 3F is a rear-side view of the printing tape after a label was peeled off.

As described above, the width Ws of the release material 24 in the second direction is prepared larger than the width Wb of the base material 21 in the printing tapes To and T, and rectangular slits S having the same width Wb in the second direction as the base material 21 are provided in the wide release material 24. Owing to these slits S, each label L included on the printing tape T and having a printed image R formed on the printing surface 25 as described above can be peeled off the printing tape T while the rectangular-shaped portion of the release material 24 located inside the slit S (the portion included in the slit inner area SI) is separated from the other portion of the release material 24 and remains on the adhesive layer 22 side (i.e., while the adhesive layer 22 remains covered with the rectangular-shaped portion described above), as shown in FIGS. 3A through 3F. In the following description, this peeled-off portion will simply be called the "label L" for convenience. After the label L has been peeled off, a space (a window WD) is left in the strip-like release material 24 inside the rectangular slit S, as illustrated in FIGS. 3D and 3F.

<Detailed Structure of the Label>

Figure 4B:
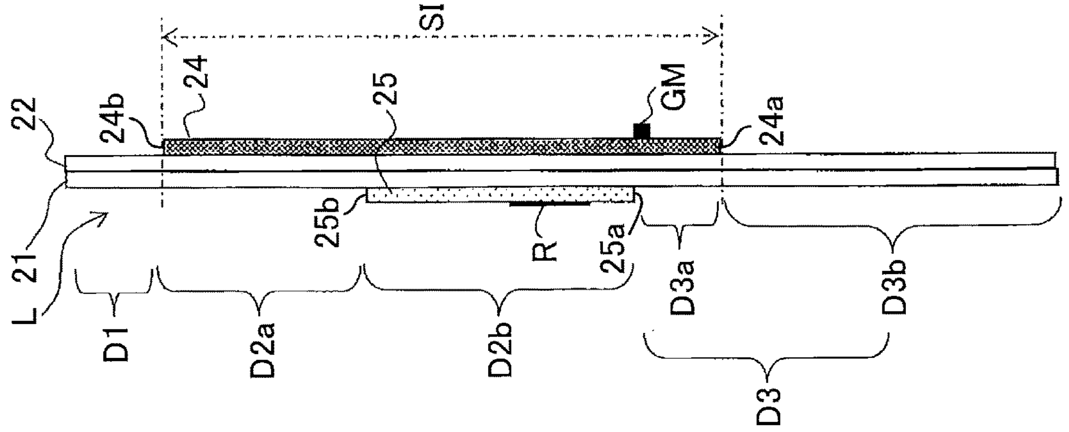
Figure 4A:
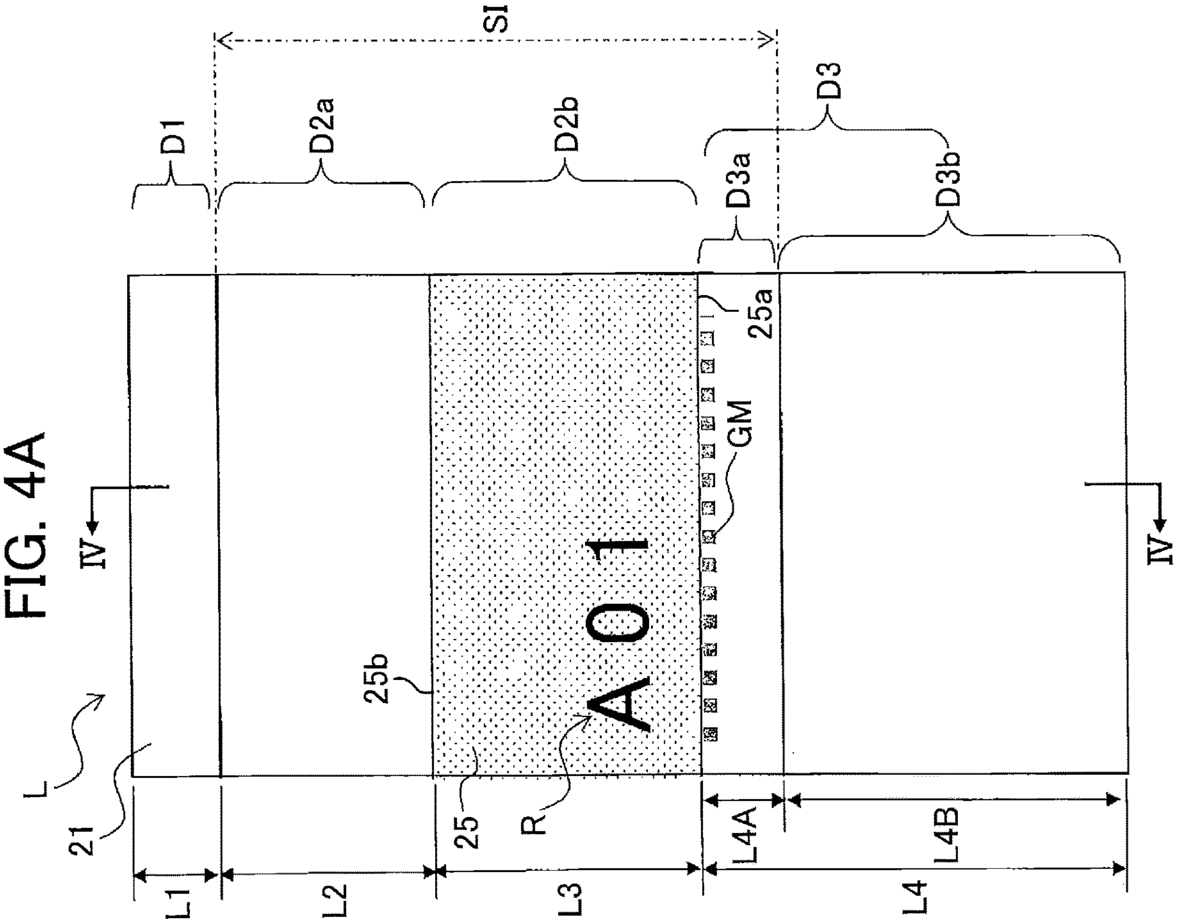

FIGS. 4A and 4B show a detailed structure of the label L separated from the printing tape T. FIG. 4A shows a plan view of one label L, and FIG. 4B shows a cross-sectional view of the structure in FIG. 4A taken along the section IV-IV.

Once printed, the label L is wrapped around an adherend 302 having a prescribed diameter or less and is used as a rotatable label. The labels L are packaged in a clear plastic bag or other packaging material as preprinted printing tapes To, printed printing tapes T, or the labels L themselves that have been separated from these printing tapes To and T. The packaging material is then placed in a packing box such as an outer case to be stored or distributed. The recommended maximum diameter is noted in the description "Can be used on a LAN cable having a maximum diameter of ________ mm," for example, on at least one of this packaging material, the packing box in which the packaging material is inserted, and an instruction manual included in the packing box together with the packaging material. This recommended maximum diameter corresponds to the prescribed diameter described above. Thus, the label L can be wrapped around an adherend 302 having a diameter equal to or smaller than the recommended maximum diameter.

As shown in FIGS. 4A and 4B, the label L has the base material 21, adhesive layer 22, release material 24, printing surface 25, and mark GM. The base material 21, adhesive layer 22, and release material 24 are layered from the front side to the rear side along the thickness direction of the label L, i.e., from the near side toward the far side along the depth direction in FIG. 4A or from the left side toward the right side in FIG. 4B along the left-right direction in FIG. 4B.

The base material 21 has the printing surface 25 on the front side thereof. The label-creating device 1 forms the printed image R on the printing surface 25. The base material 21 is configured of a transparent material provided with a lower stiffness than the release material 24. Such a base material 21 can be formed of a transparent resin material like PET, PVC, PE, or PP, for example. When formed of PET, for example, the base material 21 may be configured with a thickness of 38 μm and a stiffness of 2.9 Gpa (Young's modulus). As described with reference to FIGS. 3A through 3F, this portion of the base material 21 is separated from the remaining portion as part of the label L by means of the cuts HC.

The adhesive layer 22 is provided on the opposite side surface of the base material 21 from the printing surface 25. The adhesive layer 22 possesses adhesive strength and may also be provided transparently.

The release material 24 is bonded to the adhesive layer 22 with a portion of the adhesive layer 22 exposed. The release material 24 is configured of a transparent material and has a higher stiffness than the base material 21. This type of release material 24 is also called a separator and may be formed of glassine paper, PET, kraft paper, and the like, for example. When formed of kraft paper, the release material 24 may be configured with a thickness of 57 μm and a stiffness of 4.5 Gpa (Young's modulus). As described with reference to FIG. 3, this portion of the release material 24 is separated as part of the label L from the remainder of the release material 24 through the slits S.

The mark GM is used for alignment when bonding together exposed sections of the adhesive layer 22 or the exposed adhesive layer 22 with the release material 24 in order to form the label L in a loop shape. Accordingly, the mark GM is provided at a position for forming the label L in a loop shape having an inner diameter greater than the prescribed diameter. Since the release material 24, adhesive layer 22, and base material 21 are all formed transparently, the mark GM can be seen through these layers in the plan views of FIGS. 2A, 2B, 3A, 3D, and 4A.

In the present embodiment, the mark GM is arranged in a position for bonding the exposed adhesive layer 22 with the release material 24. More specifically, the mark GM is separated a prescribed distance from the bottom edge 24*a* toward the top edge 24*b* of the release material 24 after the label L has been created and is disposed below the bottom edge 25*a* of the printing surface 25, i.e., in the non-adhesive area D3*a*, as illustrated in FIG. 4B. The mark GM is preferably provided in the non-adhesive area D3*a* at a position near the bottom edge 25*a* of the printing surface 25. Asa result, the adhesive area D1 (the adhesive layer 22) can be bonded with the non-adhesive area D3*a* (the release material 24) by wrapping the label L around the adherend 302 until the bottom edge of the adhesive area D1 (the top edge 24*b* of the release material 24) is approximately aligned with the mark GM. A method of using this mark GM when wrapping the label L around the adherend 302 will be described later.

In the following description, the "bottom edge" refers to the lower edge in the up-down direction on the drawing, and the "top edge" refers to the upper edge in the up-down direction on the drawing. For example, the printing surface 25 has the top edge 25*b* and the bottom edge 25*a* in the first direction, as illustrated in FIGS. 4A and 4B.

The label L will be described for each functional area. That is, the label L is provided with the adhesive area D1, non-adhesive area D2*a*, non-adhesive area D2*b*, and partial adhesive area D3 (the non-adhesive area D3*a* and adhesive area D3*b*) from the second side of the first direction (the upper side in the drawing) toward the first side of the first direction (the lower side in the drawing).

In the adhesive area D1, the base material 21 and adhesive layer 22 are layered in order from the first side toward the second side in the thickness direction (from the left side toward the right side in FIG. 4B). Thus, the entire region of the adhesive area D1 is provided with an adhesive property owing to the adhesive layer 22. Note that the adhesive area D1 has a length L1 in the first direction.

In the non-adhesive area D2*a*, the base material 21, adhesive layer 22, and release material 24 are layered in order from the first side toward the second side in the thickness direction (from the left side toward the right side in FIG. 4B). Thus, the entire region of the non-adhesive area D2*a* is non-adhesive, as the adhesive property of the adhesive layer 22 is inhibited by the release material 24. The non-adhesive area D2*a* has a length L2 in the first direction.

In the non-adhesive area D2*b*, the printing surface 25, base material 21, adhesive layer 22, and release material 24 are layered in order from the first side toward the second side of the thickness direction (from the left side toward the right side in FIG. 4B). Thus, the entire region of the non-adhesive area D2*b* is non-adhesive, as the adhesive property of the adhesive layer 22 is inhibited by the release material 24. At this time, the printing surface 25 provided with the printed image R is disposed in the non-adhesive area D2*b* adjacent to the non-adhesive area D3*a*. In this example, the printing surface 25 is prepared by applying ink (an ink coating layer) of a suitable color to the base material 21. As has been described, the print head 7 forms the printed image R, which is the text "A01," on the printing surface 25. The non-adhesive area D2*b* has a length L3 in the first direction.

In the non-adhesive area D3*a* of the partial adhesive area D3, the base material 21, adhesive layer 22, and release material 24 are layered in order from the first side toward the second side of the thickness direction (from the left side toward the right side in FIG. 4B). Thus, the entire region of the non-adhesive area D3*a* is non-adhesive, as the adhesive property of the adhesive layer 22 is inhibited by the release material 24. The non-adhesive area D3*a* has a length L4A in the first direction.

Note that the non-adhesive area D2*a*, non-adhesive area D2*b*, and non-adhesive area D3*a* are portions positioned within the slit inner area SI described above (refer to the notation in FIGS. 4A and 4B).

In the adhesive area D3*b* of the partial adhesive area D3, the base material 21 and adhesive layer 22 are layered in order from the first side toward the second side of the thickness direction (from the left side toward the right side in FIG. 4B). (A portion of the release material 24 may also be included in this region by adjusting the position of the slit S.) Thus, the entire region or at least part of the region of the adhesive area D3*b* is provided with an adhesive property through the adhesive layer 22. The adhesive area D3*b* has a length L4B in the first direction. As a result, the partial adhesive area D3 has a length L4 in the first direction (L4A+L4B), and at least part of the partial adhesive area D3 is an adhesive area.

The base material 21 is provided with no particular perforations or slits (excluding the cuts HC described above), and the cross-sectional shape of this layer in the thickness direction is continuous along the first direction.

<Procedure for Printing and Attaching a Label>

Here, a method of printing and attaching a label L will be described. The method of printing and attaching a label L has roughly three steps (first through third steps). As described above, the label L has: the base material 21; the adhesive layer 22 provided on the back surface, i.e., the first surface of the base material 21; and the release material 24 bonded to the adhesive layer 22 with a portion of the adhesive layer 22 exposed. The release material 24 has a higher stiffness than the base material 21. In the first step, the label-creating device 1 is used to print the top surface, i.e., the second surface of the base material 21 constituting this label L, and specifically to print the printing surface 25. As shown in FIGS. 3A through 3F and other drawings, the printed label L is separated from the printing tape T through the cuts HC in the base material 21 and the slit S in the release material 24. As shown in FIG. 3D, the non-label portion LB is first separated from the printing tape T, after which the label L is separated from the printing tape T. After completing this first step, the process advances to the second step.

Figure 5B:
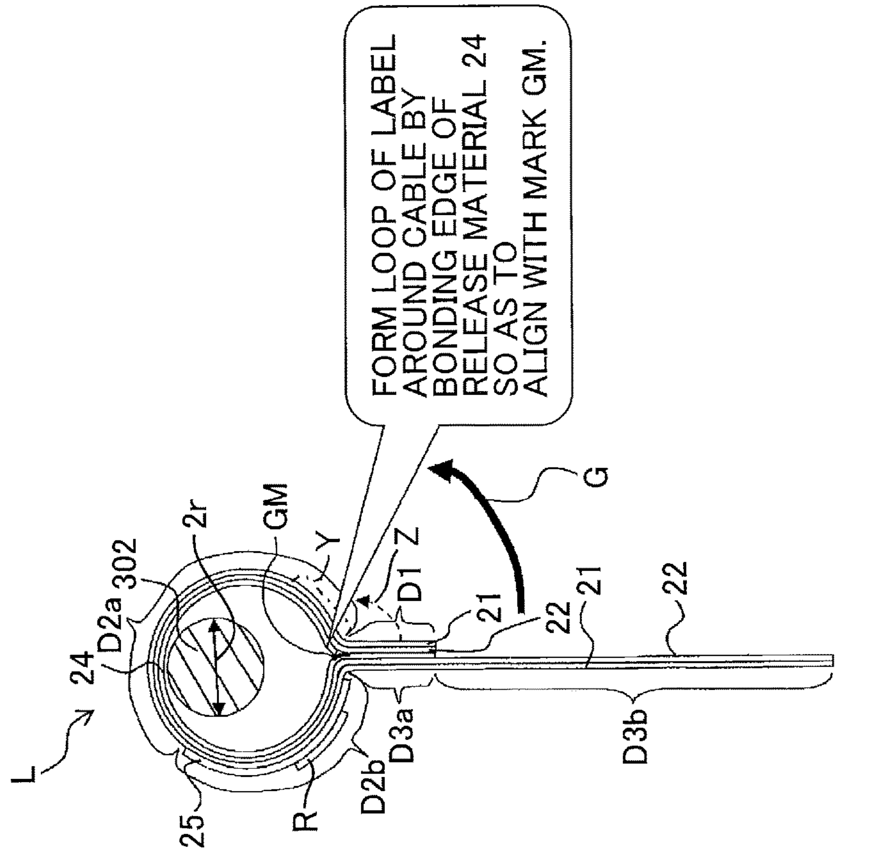
Figure 5A:
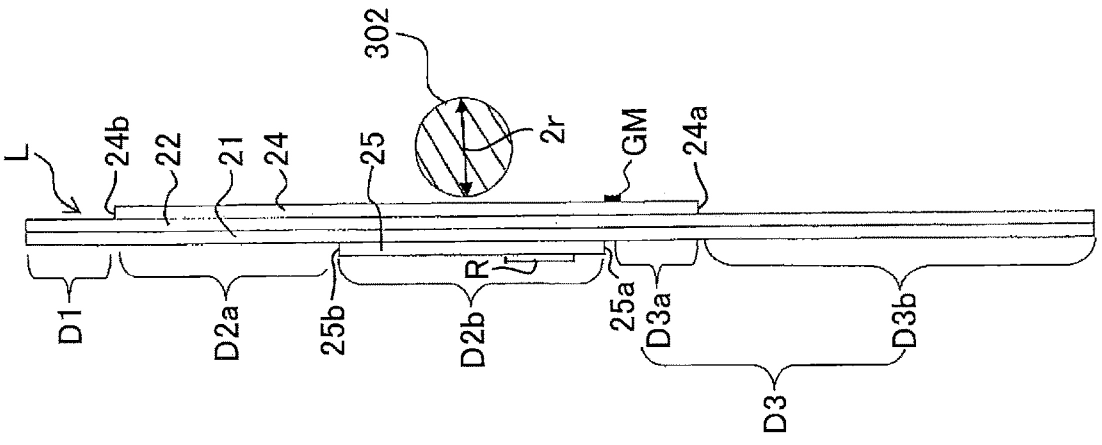

FIGS. 5A through 8D show a procedure for attaching the label L to the adherend 302 in the second step and the third step. FIGS. 5A and 5B are explanatory diagrams that explain the second step through a cross section in a plane perpendicular to the axial direction of the adherend 302. FIGS. 6A and 6B are explanatory diagrams that explain the second step through a schematic perspective view when the label L is formed in a loop shape around the adherend 302. FIGS. 7A through 7C are explanatory diagrams that explain the third step through a cross section in a plane perpendicular to the axial direction of the adherend 302. FIGS. 8A through 8D are explanatory diagrams that explain the third step with schematic perspective views when a gap between the label L and the adherend 302 is reduced and a protruding portion of the label L is wrapped around the adherend 302. These examples show shown cases in which the label L is attached by wrapping the label L around a cylindrical or cable-like adherend 302 having a diameter 2*r*.

In the second step, the label L is wrapped around the adherend 302 to form a loop shape, and exposed sections of the adhesive layer 22 or an exposed section of the adhesive layer 22 and the release material 24 are bonded together while leaving a gap between the label L and the adherend 302. More specifically, the label L has areas extending continuously in the order shown in FIG. 5A: adhesive area D1→non-adhesive area D2*a*→non-adhesive area D2*b*→partial adhesive area D3. First, the adherend 302 is placed on the release material 24 side of the non-adhesive area D2*a*. At this time, the adherend 302 is arranged near the printed image R on the printing surface 25. Next, the adhesive area D1, non-adhesive area D2*a*, and non-adhesive area D2*b* of the label L are bent into a concave shape with the release material 24 on the inside, as illustrated in FIG.

5B. As shown in FIGS. 5B and 6A through 8A, the adhesive layer 22 in the adhesive area D1 is bonded to the release material 24 in the non-adhesive area D3*a* while aligning the top edge 24*b* of the release material 24 in FIG. 5A with the mark GM. Through this action, the label L is formed into a loop shape around the adherend 302 (a cable, for example), as illustrated in FIG. 5B and FIGS. 6A through 8A. In the present embodiment, the mark GM can suppress positional deviation when the adhesive layer 22 and release material 24 are bonded together. Note that instead of arranging the adherend 302 first in the second step, the label L may be first formed into a loop shape and the adherend 302 may be subsequently inserted into the loop of the label L. After completing the second step, the process advances to the third step.

Figure 7A:
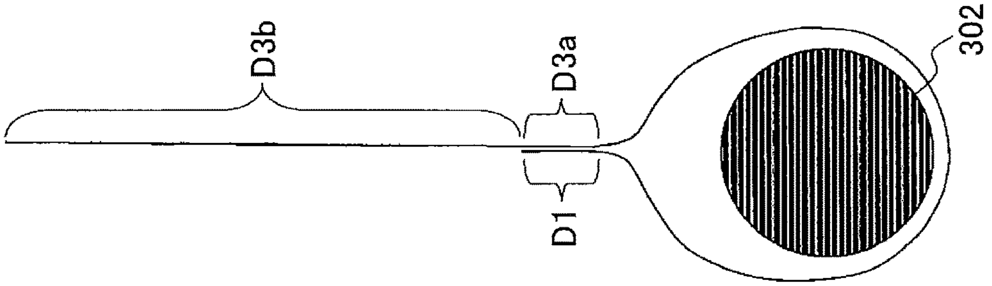
Figure 7B:
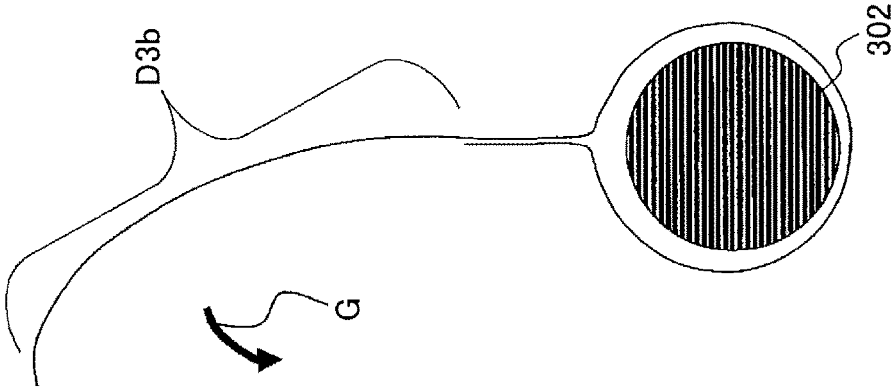
Figure 7C:
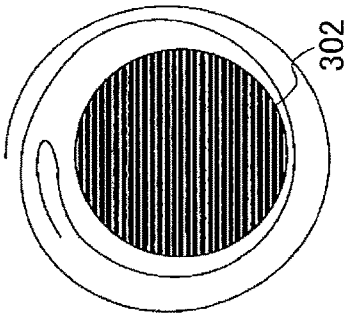
Figure 8A:
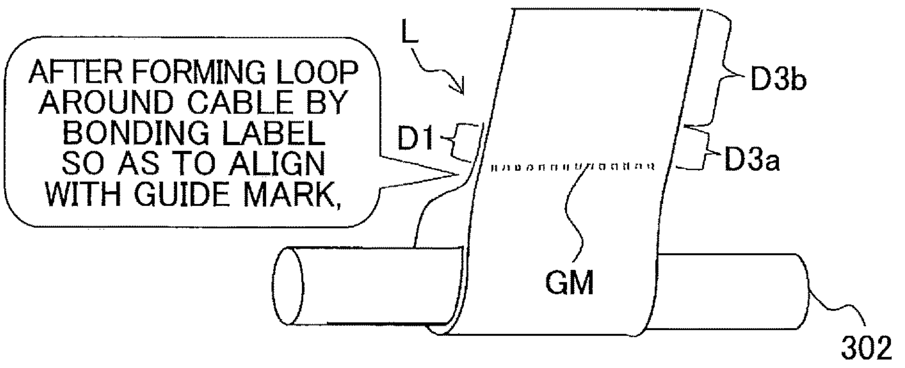
Figure 8B:
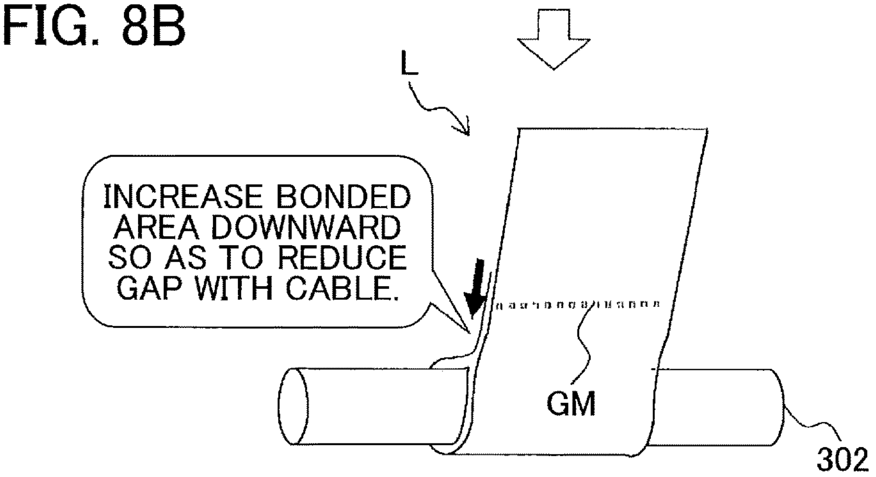
Figure 8C:
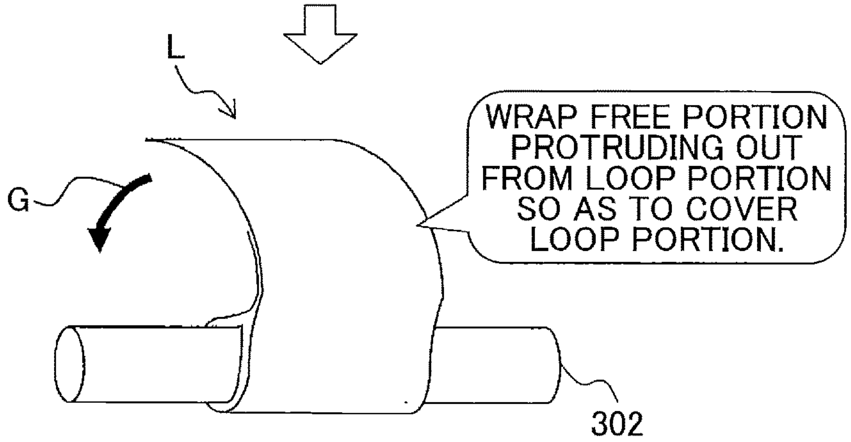
Figure 8D:
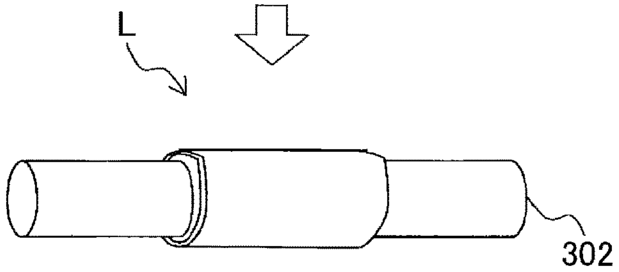

In the third step, the release material 24 is folded over to reduce the gap between the release material 24 and adherend 302. More specifically, a large gap exists between the release material 24 of the label L (the inside of the loop) and the adherend 302, as shown in FIGS. 7A and 8A. In this state, the user can gradually reduce the inner area of the loop using a finger or the like to constrict the end of the loop on the mark GM side inward from the mark GM, as shown in FIG. 8B. Here, the user does not decrease the gap to the extent that the gap becomes nothing since the label L is to be used as a rotatable label. However, by pressing with a finger or the like the user can easily adjust the gap between the adherend 302 and the release material 24.

After reducing the gap, the user then begins laying the free portion of the label L protruding out from the loop-shaped portion over the second surface of the base material 21, that is, the printing surface 25, in the direction indicated by the arrow G, as shown in FIGS. 7B, 7C, 8C, and 8D. That is, the remaining portion of the partial adhesive area D3 that is not used in the structure encircling the adherend 302 (the adhesive area D3*b* in this example) is wrapped in the direction of the arrow G indicated in FIG. 5B so that the bonded portion of the adhesive area D1 and non-adhesive area D3*a* are on the inside (for example, the adhesive area D1 is folded back as indicated by an arrow Z and comes in contact with a region Y). At this time, the remaining portion of the partial adhesive area D3 is wrapped around the outer circumferential portions of the non-adhesive area D2*a* and non-adhesive area D2*b* configuring a cylinder while sequentially covering the areas D2*a* and D2*b* in this order. Using the adhesive property of the adhesive layer 22, the adhesive area D3*b* of the partial adhesive area D3 is then bonded to the outer circumferential portions of the non-adhesive area D2*a* and non-adhesive area D2*b* to complete attachment of the label L to the adherend 302. Through the above process, the label L is rotatably wrapped around the adherend 302 and can be used as a rotatable label.

<Sample Application for the Label>

Figure 9:
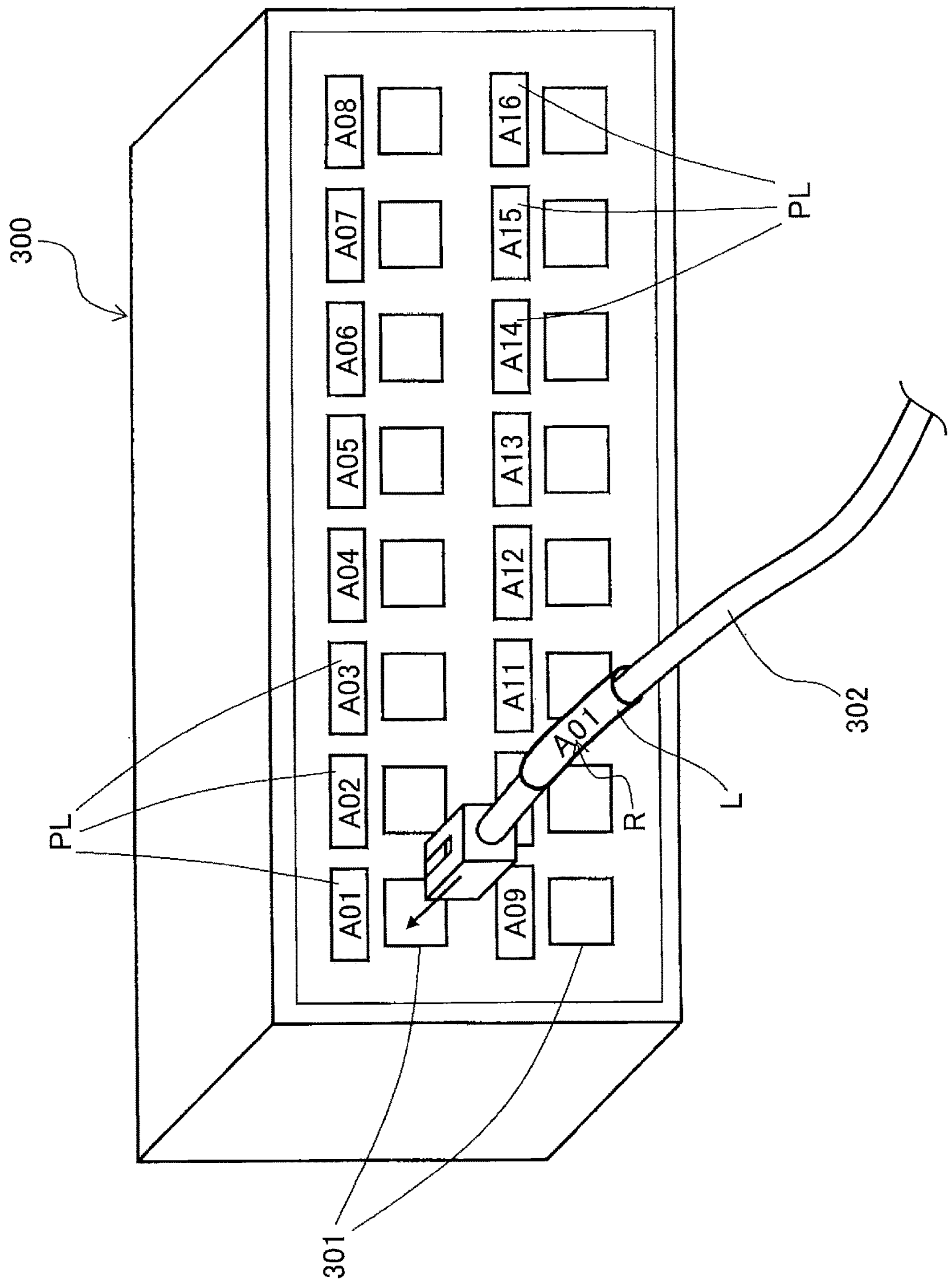
FIG. 9 is a perspective view showing a sample application of the label.

FIG. 9 shows a sample application of the label L described above. In this example, a cable for use with a switching hub that relays information over a network, such as a wired LAN, is applied as the adherend 302. The adherend 302 will be referred to as cable 302 here. The switching hub 300 in FIG. 9 has eight slots 301 in each of a top row and a bottom row (a total of sixteen slots). In the example of the drawing, plates PL indicating the ID names "A01" through "A08" are provided in sequence from the left to correspond to the eight slots 301 in the top row, and plates PL indicating the ID names "A09" through "A16" are provided in sequence from the left to correspond to the eight slots 301 in the bottom row.

The cable 302 must be appropriately connected to the corresponding slot 301. To facilitate connections, the label L described above is mounted on the end of each cable 302 that is to be inserted into one of the slots 301, and the printed image R formed on each label L has the same content as the ID name for the slot 301 to which the cable 302 is to be connected. In other words, a label L printed with the same text as the ID name on the plate PL of the slot 301 to which the cable 302 is to be connected is affixed to the cable 302. This clarifies the correlations between slots 301 and cables 302 that are to be connected to the slots 301, thereby preventing incorrect wiring.

Figure 10A:
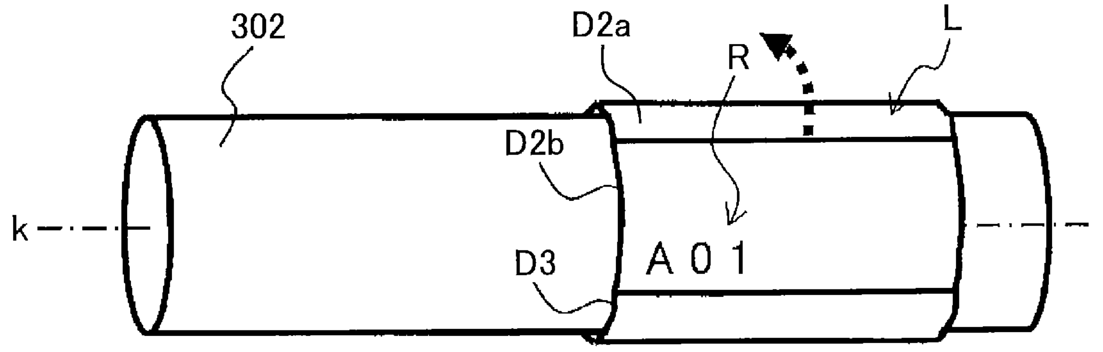
Figure 10B:
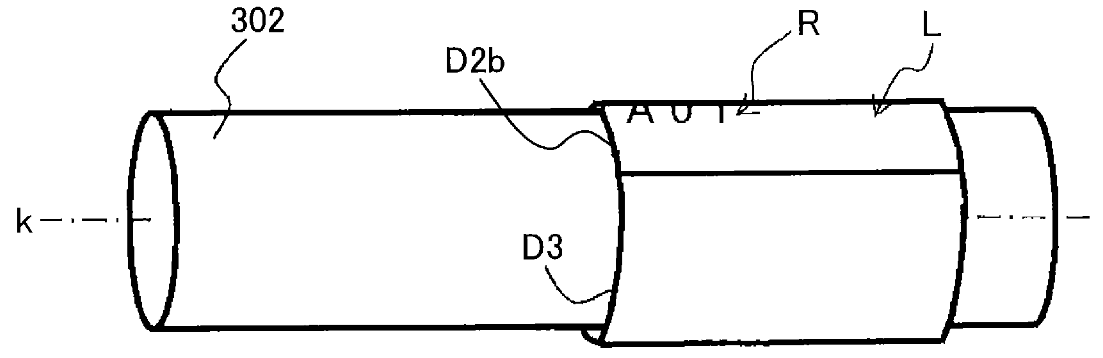

FIGS. 10A and 10B schematically show the attached state of the label L on the cable 302. An axial center k of the cable 302 is also indicated in the drawing. According to the structure described above, the label L is affixed to the cable 302 constituting the adherend so as to be rotatable about the cable 302. In the sample state shown in FIG. 10A, the non-adhesive area D2*b* is arranged such that the printed image R of "A01" provided on the non-adhesive area D2*b* is facing the viewer of the drawing. Although the transparent adhesive area D3*b* is actually present so as to cover the outer circumferential side of the non-adhesive area D2*b*, the adhesive area D3*b* has been omitted from FIG. 10A and FIG. 10B described later to prevent complicating the diagram and to facilitate understanding. The label L can be shifted to the orientation in which the partial adhesive area D3 faces the viewer of the drawing as shown in FIG. 10B by rotating the label L in the direction of the dashed arrow (i.e., a circumferential direction) from the state shown in FIG. 10A. Similarly, if the printed image R is not easily readable when the label L is fixed to the cable 302 in the position shown in FIG. 10B, the label L is rotatable. Accordingly, by rotating the label L in the direction opposite that described above to the position shown in FIG. 10A, the printed image R can be made visible.

Effects of the Embodiment

As described above, the label L according to the present embodiment is used by forming the label L in a loop shape that is wrapped around the adherend 302. That is, the user first forms the label L in a loop shape by bonding together exposed sections of the adhesive layer 22 or an exposed section of the adhesive layer 22 and the release material 24. The mark GM is provided on the label L for alignment when forming this loop shape. Further, this mark GM is provided at a position such that the inner diameter of the loop shape formed in the label L is greater than the outer diameter of the adherend 302 (the prescribed diameter). By using the mark GM for alignment to form the loop shape in this way, even users unfamiliar with the operation can always ensure a gap is formed between the adherend 302 and the label L. Hence, at the stage of forming this loop shape, the label L can be prevented from becoming too tight around the adherend 302.

After the label L is formed in a loop shape as described above, the user reduces the gap between the adherend 302 and the label L while wrapping the free portion of the label L protruding out from the loop-shaped portion over the printing surface 25 of the base material 21 and attaching the label L to the adherend 302. Here, the label L can be suppressed from being wrapped tightly relative to the adherend 302 since the release material 24 having greater stiffness than the base material 21 must be folded over.

When the label L is ultimately attached to the adherend 302 as a result of the above operations, a gap can be secured between the label L and the adherend 302, thereby preventing the label L from becoming difficult to rotate relative to the adherend 302.

According to the present embodiment, the mark GM is also disposed at a position for bonding the exposed section of the adhesive layer 22 with the release material 24. Hence, by using the mark GM for alignment when bonding the exposed section of the adhesive layer 22 with the release material 24 to form the label L into a loop shape, a gap can always be formed between the adhesive layer 22 and the label L.

In the present embodiment, the labels L are packaged in a packaging material. The prescribed diameter is a recommended maximum diameter that is noted on this packaging material, or on the packing box in which the packaging material is included, or in an instruction manual included in the packing box together with the packaging material. Accordingly, labels can be prevented from being difficult to rotate about an adherend when wrapped around an adherend having the recommended maximum diameter for usage noted on the packaging material, on the packing box, or in the instruction manual.

According to the present embodiment, the base material 21 and adhesive layer 22 are provided with a transparent or semitransparent color. Therefore, when the label L is formed into a loop shape and the free portion of the label L protruding out from the loop-shaped portion is subsequently wrapped so as to cover the printing surface 25, the content of the printed image R on the printing surface 25 can be seen through the base material 21 and adhesive layer 22 covering the printing surface 25.

An embodiment of the present disclosure has been described above in detail while referring to the accompanying drawings. However, it goes without saying that the technical scope of the present disclosure is not limited to the embodiment described herein. Those skilled in the art to which the present disclosure belongs may arrive at many modifications, adjustments, and combinations within the scope of the technical ideas in the present disclosure defined by the claims. Therefore, technologies produced from these modifications, adjustments, combinations, and the like naturally also fall within the technical scope of the disclosure. Some of these variations will be described below. In these variations, the same reference numerals are assigned to parts similar to those in the embodiment, and descriptions of these parts will be omitted or simplified as appropriate.

<First Variation>

In the example of the embodiment described above, the mark GM is formed on the release material 24, as shown in FIG. 4B. By aligning the top edge 24*b* of the release material 24 with the mark GM, as shown in FIG. 5B, the adhesive layer 22 (the adhesive area D1) and the release material 24 (the non-adhesive area D3*a*) are bonded together. However, the position in which the mark GM is formed is not limited to this example. For example, the mark GM may be formed on the base material 21, and the edge of the base material 21 may be aligned with the mark GM when bonding. This first variation will be described below.

Figure 11B:
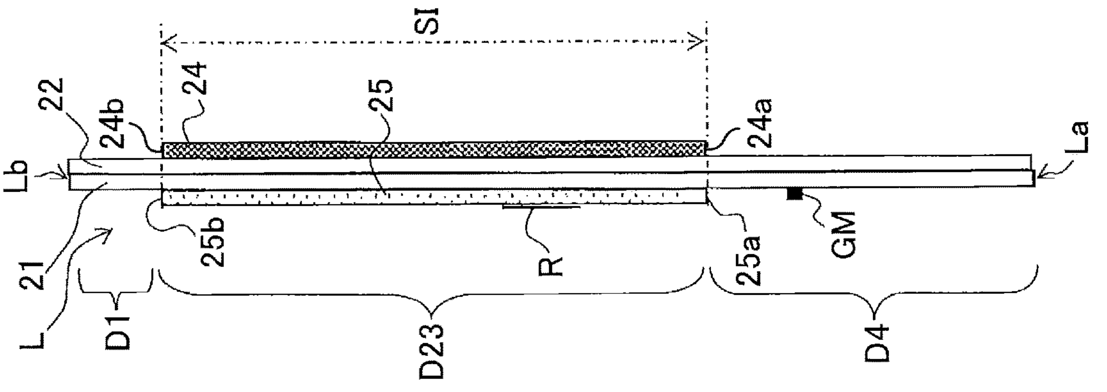
Figure 11A:
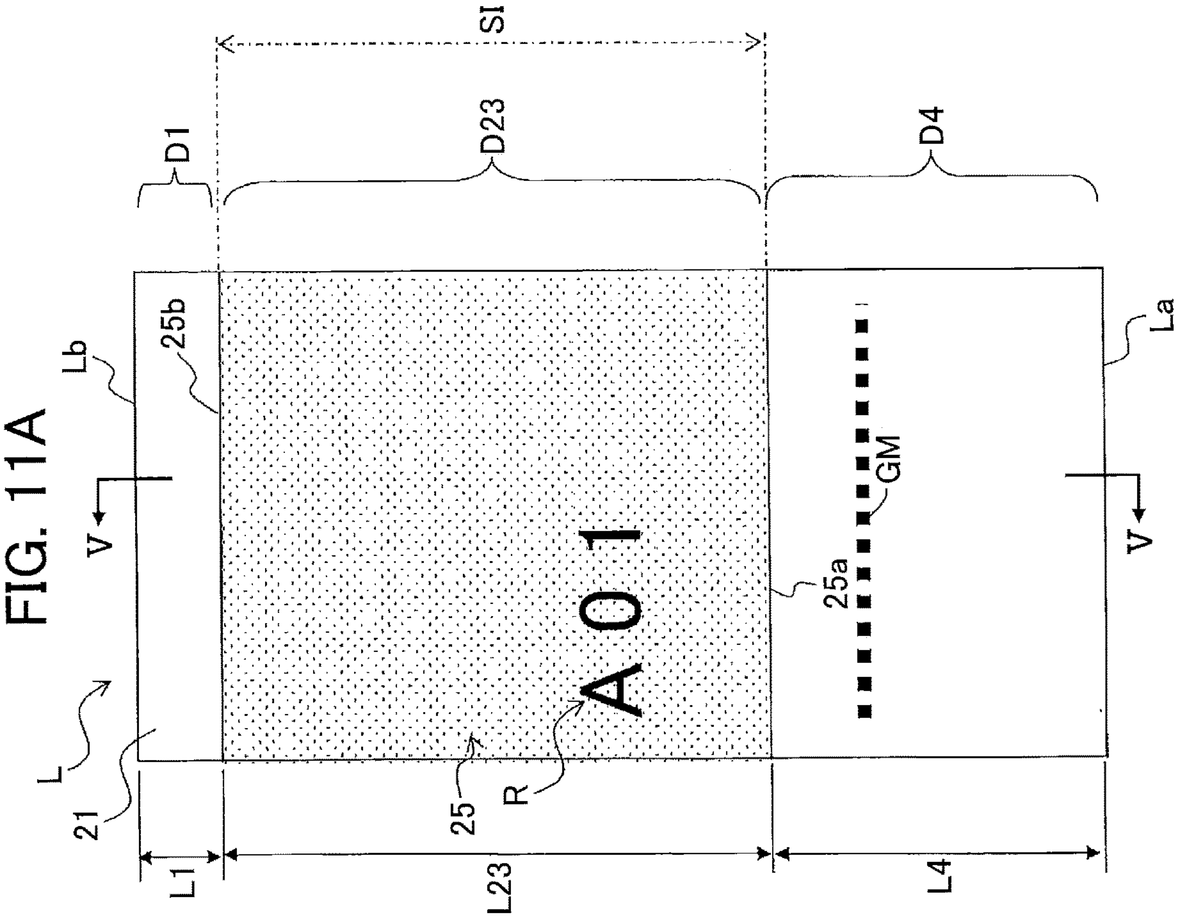
Figure 12B:
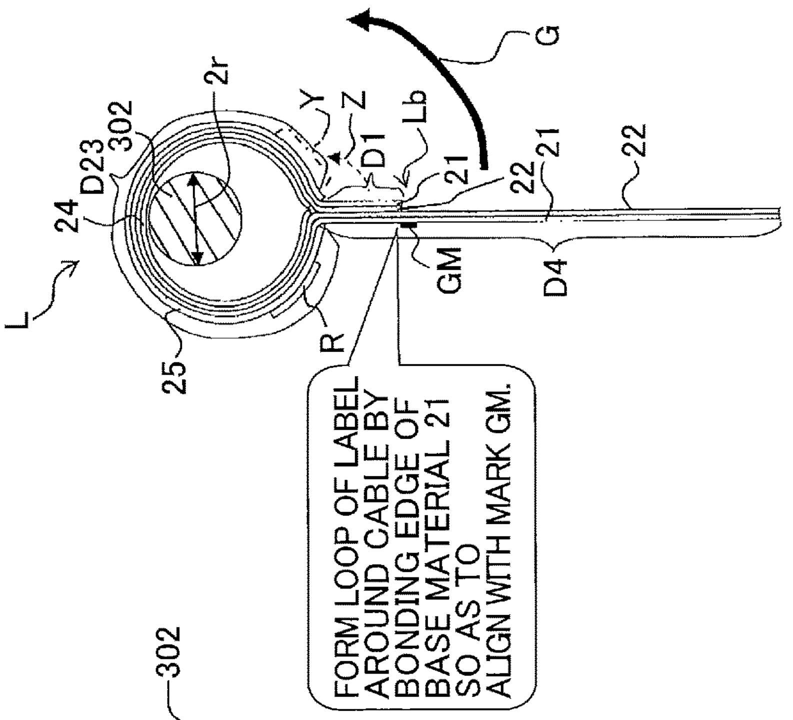
Figure 12A:
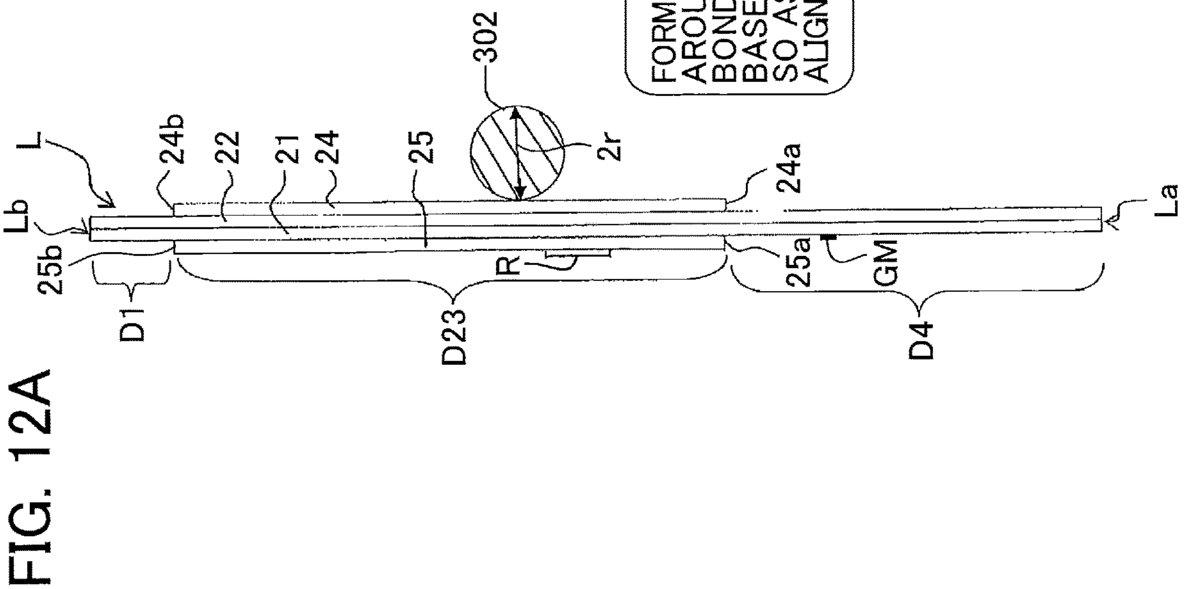

FIGS. 11A and 11B show a detailed structure of the label L that has been separated from the printing tape T according to the first variation. FIG. 11A is a plan view of a single label L, and FIG. 11B is a cross-sectional view of the structure in FIG. 11A taken along the section V-V. FIGS. 12A and 12B are explanatory diagrams that explain the second step according to the first variation through a cross section in a plane perpendicular to the axial direction of the adherend 302. FIGS. 11A and 11B correspond to FIGS. 4A and 4B in the embodiment, and FIGS. 12A and 12B correspond to FIGS. 5A and 5B in the embodiment.

In the label L according to the first variation, the printing surface 25 is formed at approximately the same length as the release material 24 in the tape length direction (the first direction), and the mark GM is formed on the base material 21, as illustrated in FIG. 11B. Here, the mark GM may be disposed below a bottom edge 25*a* of the printing surface 25 and arranged closer to the bottom edge 25*a* side than a bottom edge La of the label L. The distance from this bottom edge 25*a* of the printing surface 25 to the mark GM may be set approximately the same as the distance from a top edge 25*b* of the printing surface 25 to a top edge Lb of the label L. Thus, the adhesive layer 22 in the adhesive area D1 may be bonded with the adhesive layer 22 in an adhesive area D4 by wrapping the label L around the adherend 302 such that the top edge Lb of the label L is approximately aligned with the mark GM. A method of using this mark GM when wrapping the label L around the adherend 302 will be described later.

The label L according to this variation will be described for each functional area. That is, the label L is provided with the adhesive area D1, anon-adhesive area D23, and an adhesive area D4 from the second side of the first direction (the upper side in the drawing) toward the first side of the first direction (the lower side in the drawing). The non-adhesive area D23 corresponds to the non-adhesive areas D2*a* and D2*b* and the non-adhesive area D3*a* of the embodiment and the adhesive area D4 corresponds to the adhesive area D3*b* of the embodiment. While the printing surface 25 is arranged only in the non-adhesive area D2*b* in the embodiment, the printing surface 25 is arranged throughout the entire non-adhesive area D23 in the present variation.

The method of printing and attaching a label L according to this first variation differs from that in the embodiment primarily in the second step. Therefore, the second step will be described here. The label L in the present variation has areas extending continuously in the order shown in FIG. 12A: adhesive area D1→non-adhesive area D23→adhesive area D4. In the second step according to this variation, the adherend 302 is first placed on the release material 24 side of the non-adhesive area D23. At this time, the adherend 302 is arranged near the printed image R on the printing surface 25. Next, the adhesive area D1 and non-adhesive area D23 of the label L are bent into a concave shape with the release material 24 on the inside, as illustrated in FIG. 12B. As shown in FIG. 12B, the adhesive layer 22 in the adhesive area D1 is bonded to the adhesive layer 22 in the adhesive area D4 while aligning the top edge Lb of the label L in FIG. 12A with the mark GM. Through this action, the label L is formed into a loop shape around the adherend 302 (a cable, for example), as illustrated in FIG. 12B. In this variation, the mark GM can suppress positional deviation between the adhesive layers 22 when the adhesive layers 22 are bonded together. Note that instead of arranging the adherend 302 first in this second step, the label L may be first formed into a loop shape, and the adherend 302 may be subsequently inserted into the loop formed in the label L. After completing the second step, the process advances to the third step. As in the embodiment, the release material 24 is folded over to reduce the gap between the label L and the adherend 302, and the attachment of the label L to the adherend 302 is completed by wrapping the free portion of the label L protruding out from the loop-shaped portion in the direction of the arrow G so as to cover the second surface of the base material 21, i.e., the printing surface 25. Through the above process, the label L is rotatably wrapped around the adherend 302 and can be used as a rotatable label. The label L according to the first variation described above can obtain the same operations and effects as the embodiment.

<Second Variation>

Figure 13B:
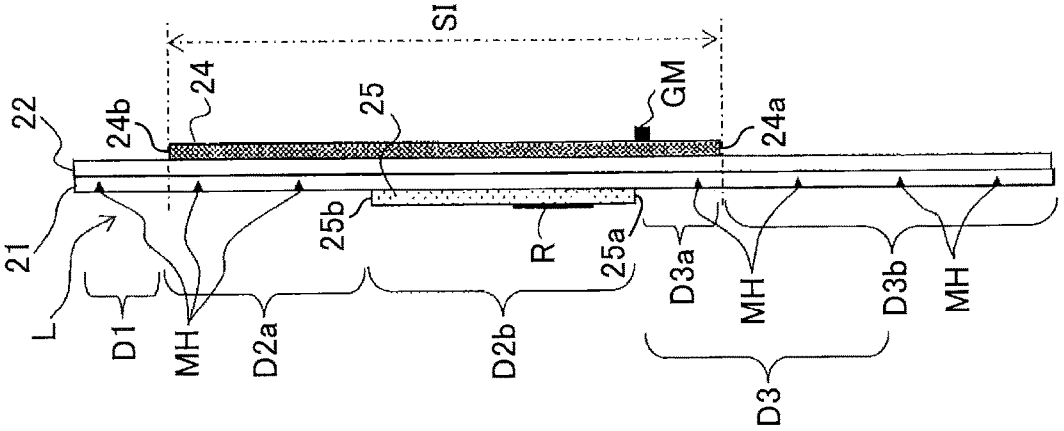
Figure 13A:
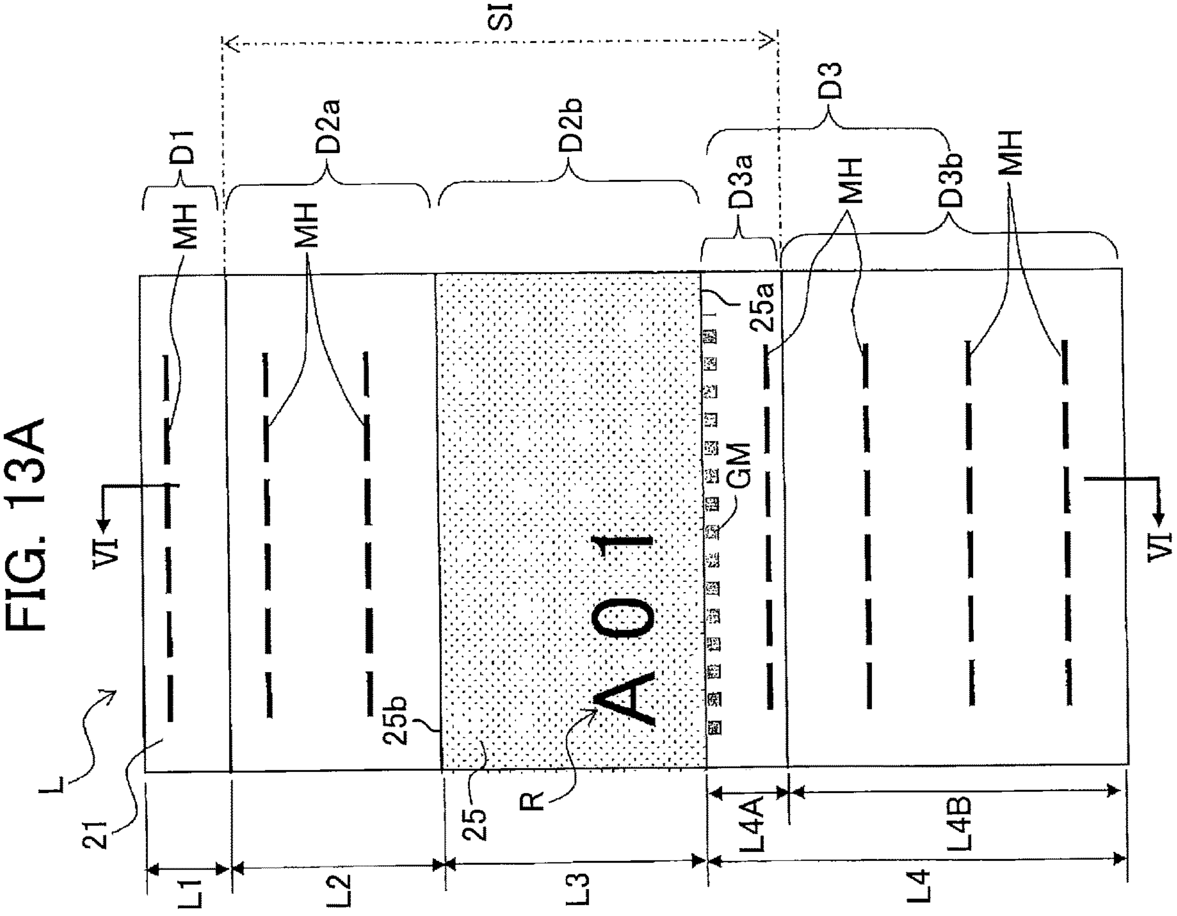

In the embodiment described above, the base material 21 is provided with no perforations or slits other than the cuts HC, but the present disclosure is not limited to such cases. For example, the base material 21 may be provided with a hole or a series of holes. FIGS. 13A and 13B show a detailed structure of the label L according to a second variation after the label L has been separated from the printing tape T. FIG. 13A is a plan view of a single label L. FIG. 13B is a cross-sectional view of the structure in FIG. 13A taken along the section VI-VI. FIGS. 13A and 13B correspond to FIGS. 4A and 4B in the embodiment.

In the label L of this variation, perforations MH comprising a series of holes are formed in the base material 21, as shown in FIGS. 13A and 13B. The perforations MH are formed along the tape width direction (the second direction) and a plurality of rows of perforations are juxtaposed in parallel in the tape length direction (the first direction). Since the stiffness of the base material 21 is weakened, making the stiffness of the release material 24 relatively stronger, the label L according to this variation can suppress the label L from becoming tightly wrapped about the adherend 302. The perforations MH may also be configured of a single hole or a combination of a single hole and a series of holes.

<Third Variation>

Figure 14A:
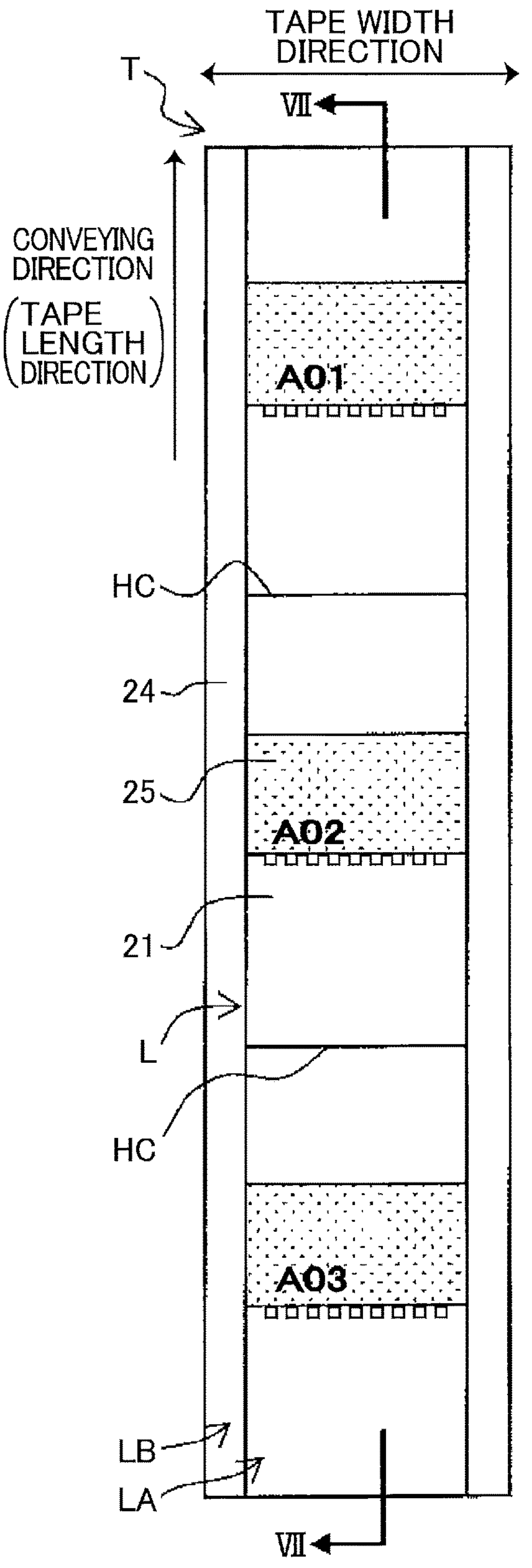
Figure 14B:
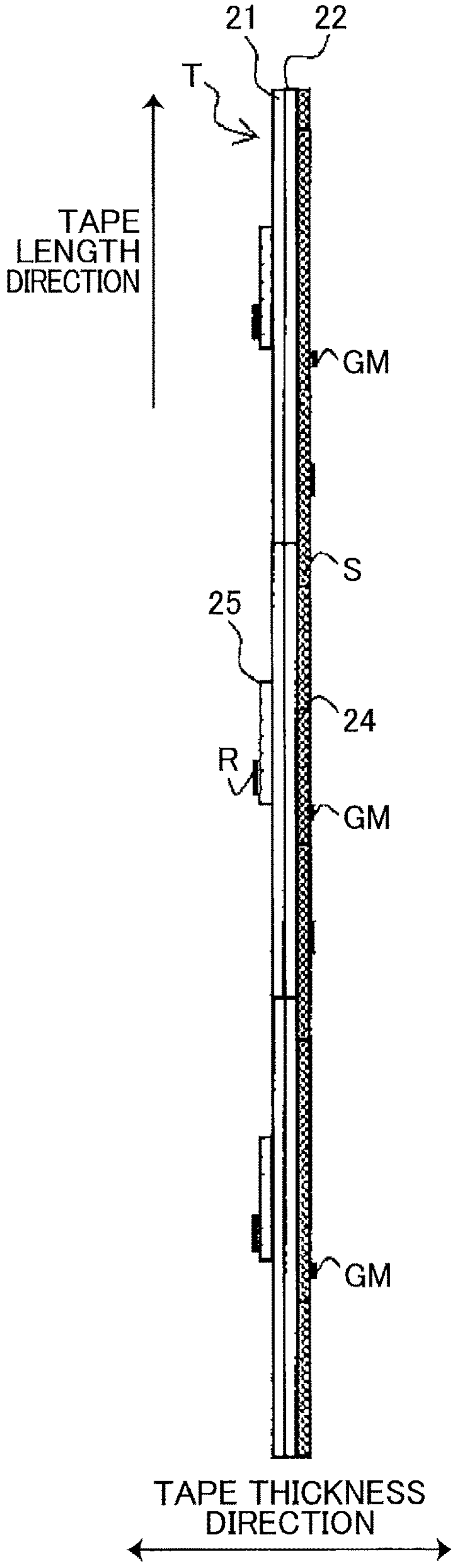
Figure 14C:
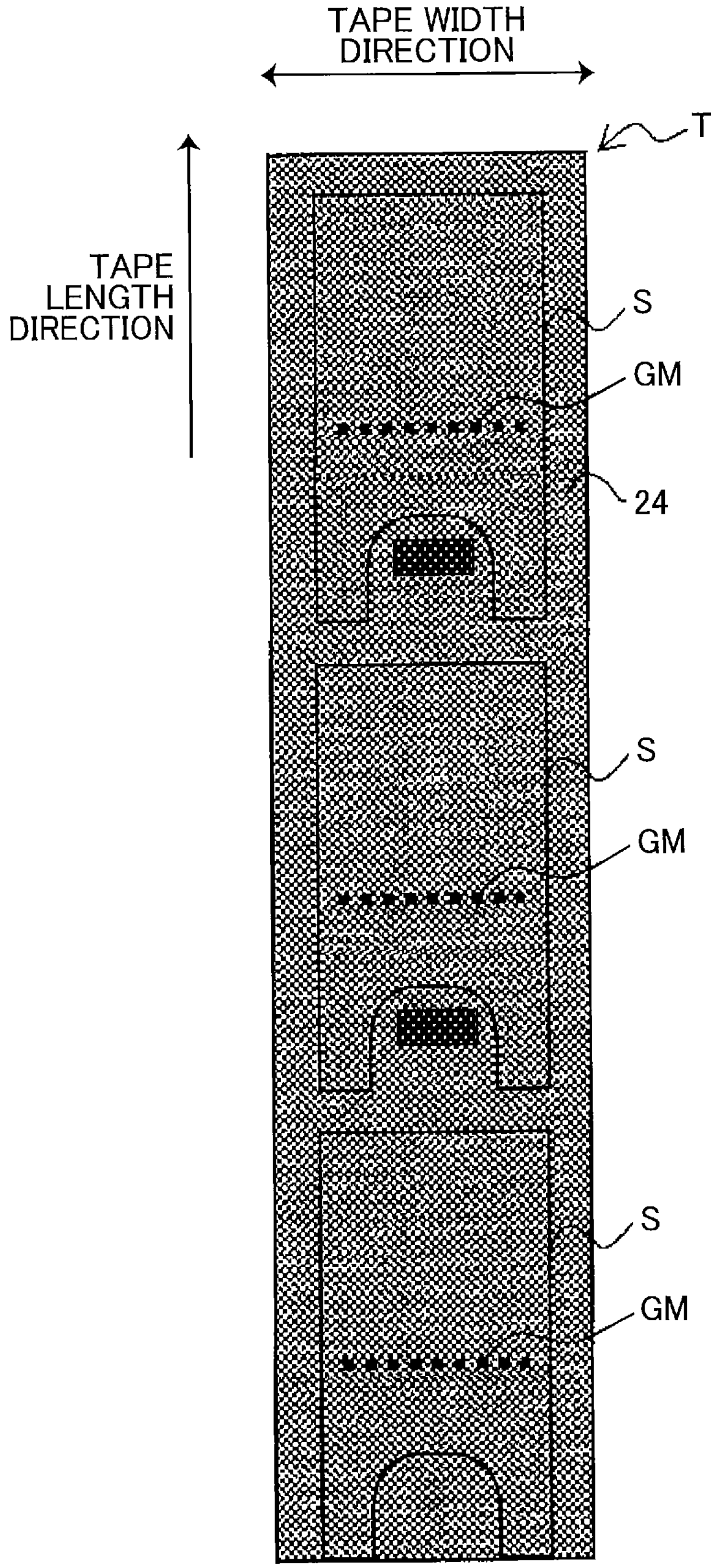
Figure 14D:
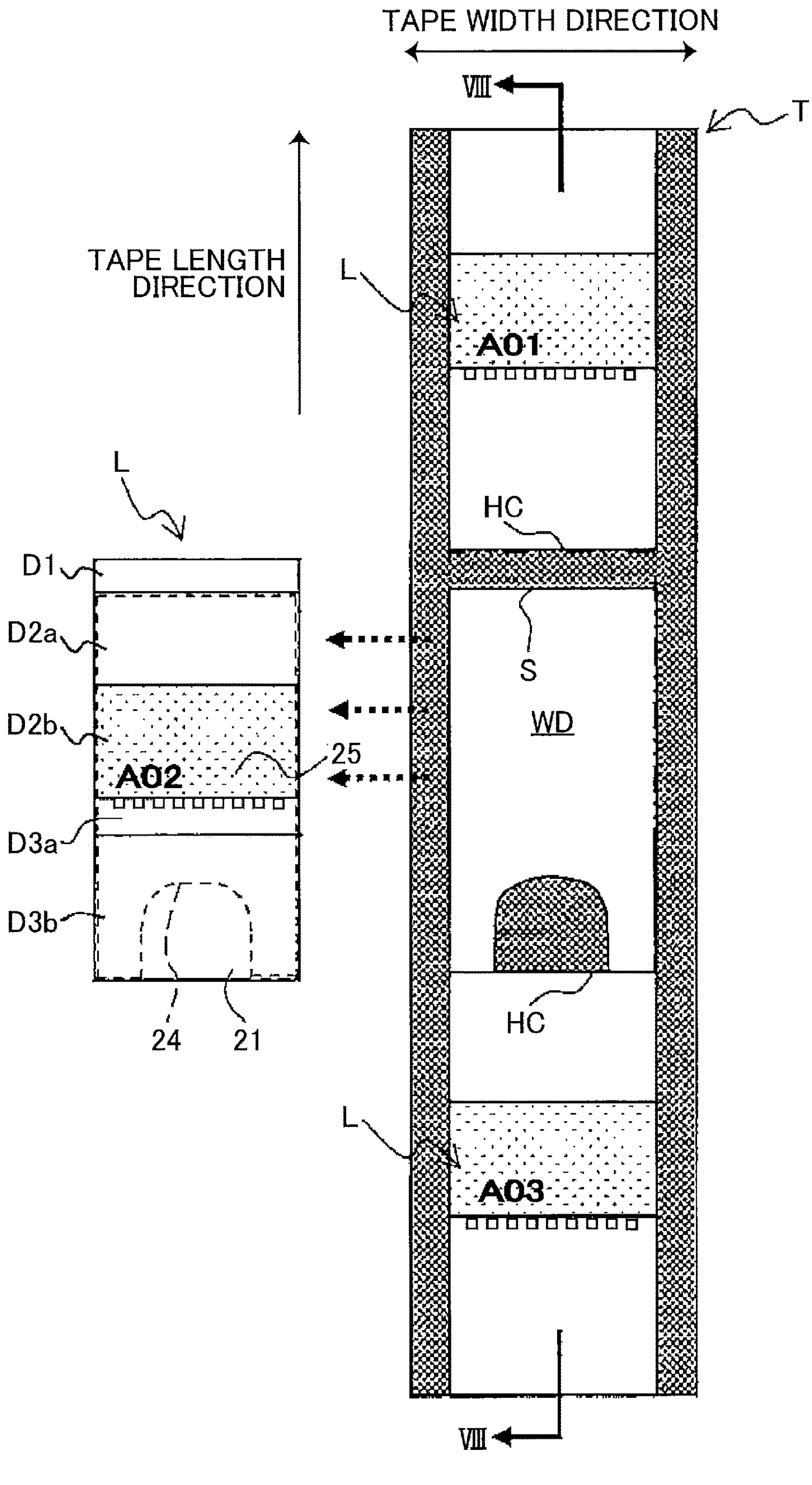
Figure 14E:
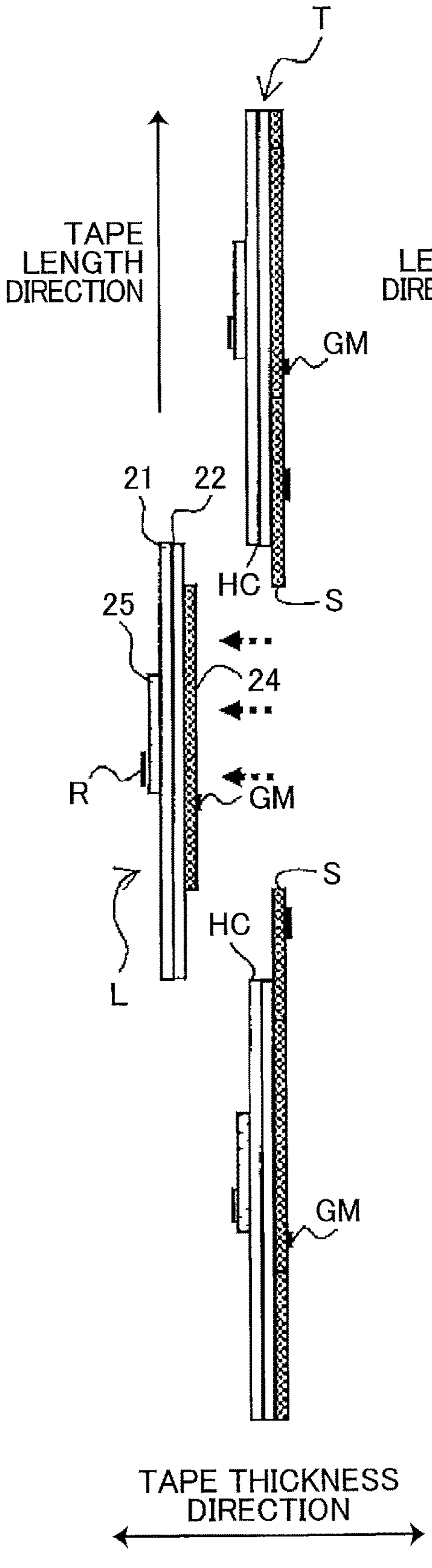
Figure 14F:
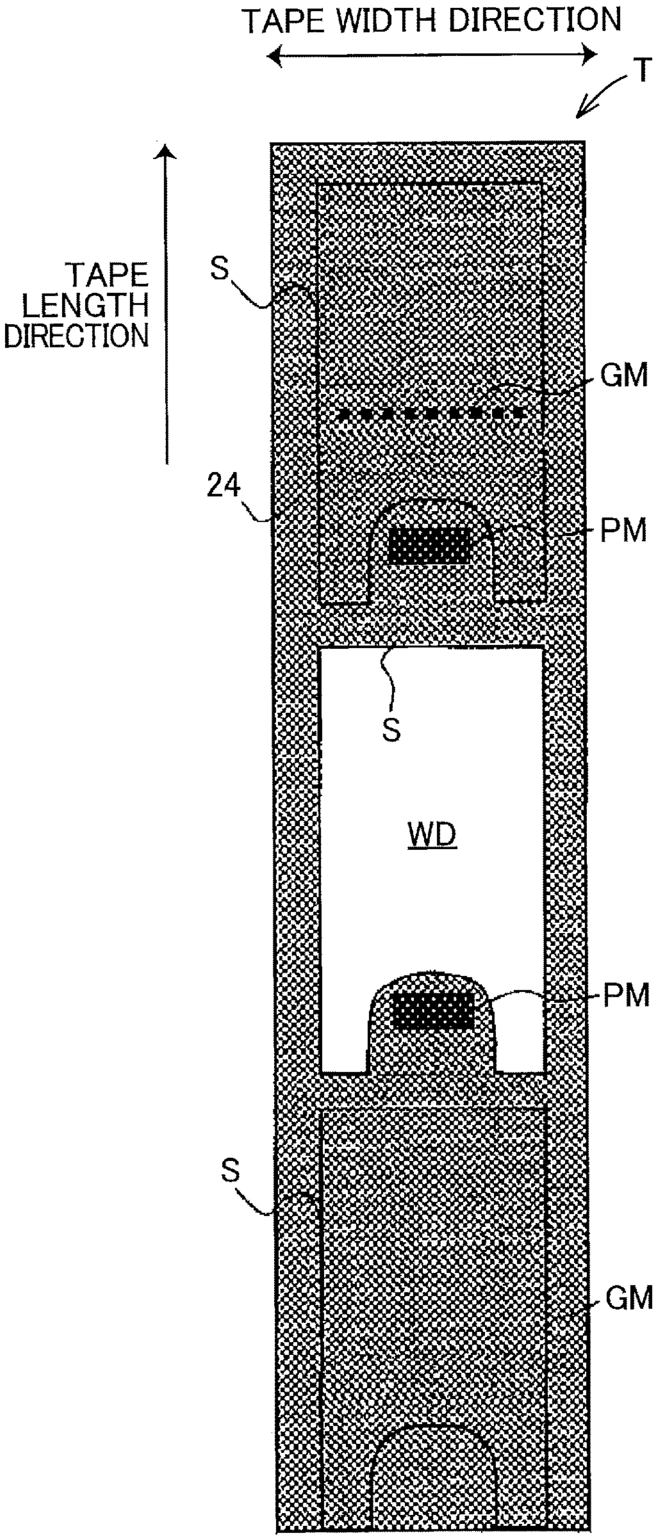

While the slits S are rectangular-shaped and the portions of the release material 24 that have been separated on the sides with the labels L are also formed in a rectangular shape in the embodiment described above, the present disclosure is not limited to this example. The slits S, and hence the portions of the release material 24 that have been separated on the sides with the labels L, may have any of various shapes. FIGS. 14A through 14F show the process of separating each label L according to this variation from the printing tape T after printing. FIG. 14A is a plan view showing the printed printing tape. FIG. 14B is a cross-sectional view of the structure in FIG. 14A taken along the section VII-VII. FIG. 14C is a rear view of the printed printing tape. FIG. 14D is a plan view showing a single label that has been peeled off the printed printing tape. FIG. 14E is a cross-sectional view of the structure in FIG. 14D taken along the section VIII-VIII. FIG. 14F is a rear view of the printing tape after the label has been peeled off. FIGS. 14A through 14F correspond to FIGS. 3A through 3F in the embodiment.

As shown in FIG. 14C, the slit S in the label L according to this variation has a shape that includes a horseshoe shape combined on the bottom of the rectangular slit S in FIGS. 3A through 3F relative to the tape length direction. In other words, at the bottom of the slit S, both edges in the tape width direction extend to a position corresponding to the label L, that is, the cut HC, while the center in the tape width direction has an inverted U-shape. Accordingly, after the label L is separated from the printing tape T in this variation, the release material 24 is arranged in the adhesive area D3*b* according to the slit S so as to have a portion on the non-adhesive area D3*a* side and portions on both sides in the tape width direction (the left and right sides in the drawing), as illustrated in FIGS. 14D through 14F. However, the portion of the release material 24 in which the positioning mark PM is located remains on the printing tape T side. The label L according to this third variation can obtain the same effects as the embodiment and the like.

<Fourth Variation>

Figure 15A:
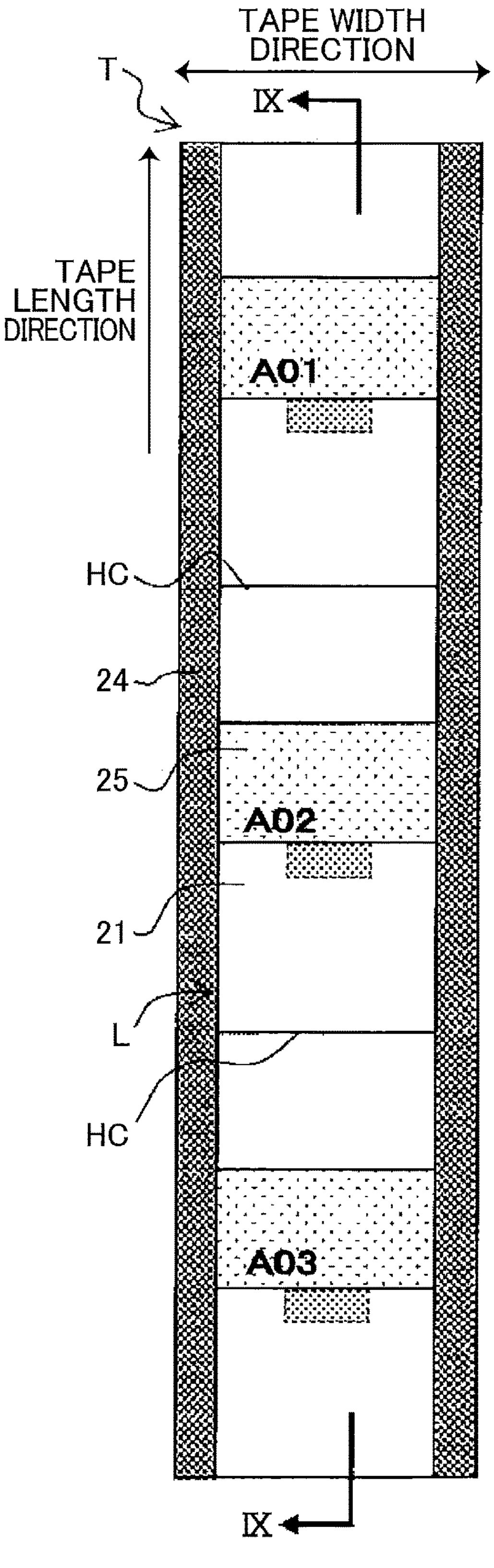
Figure 15B:
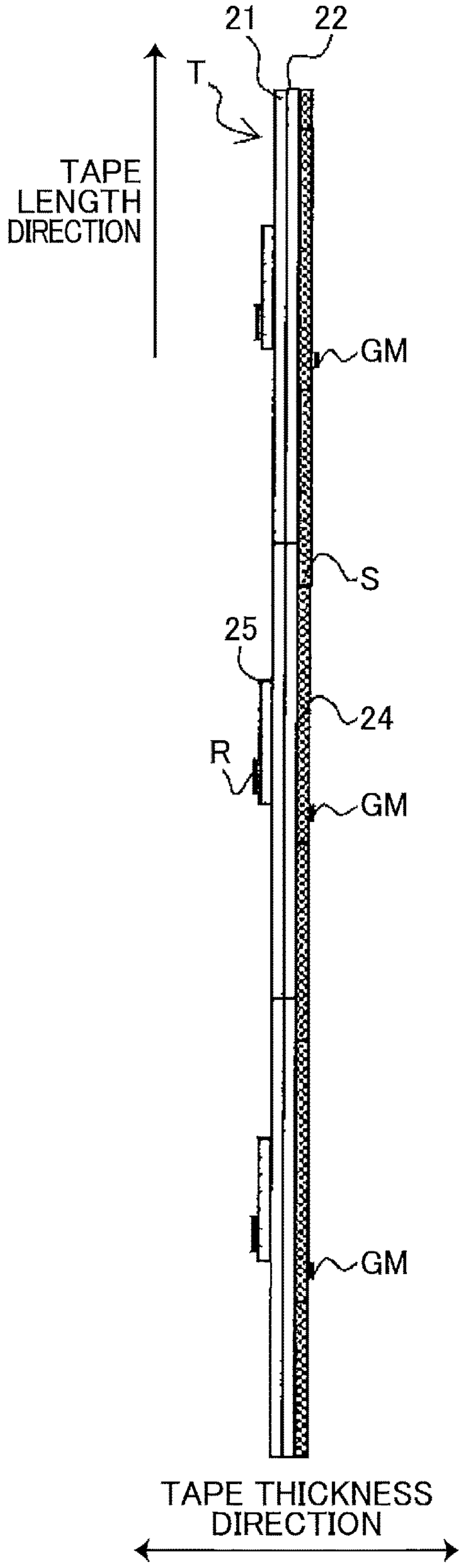
Figure 15C:
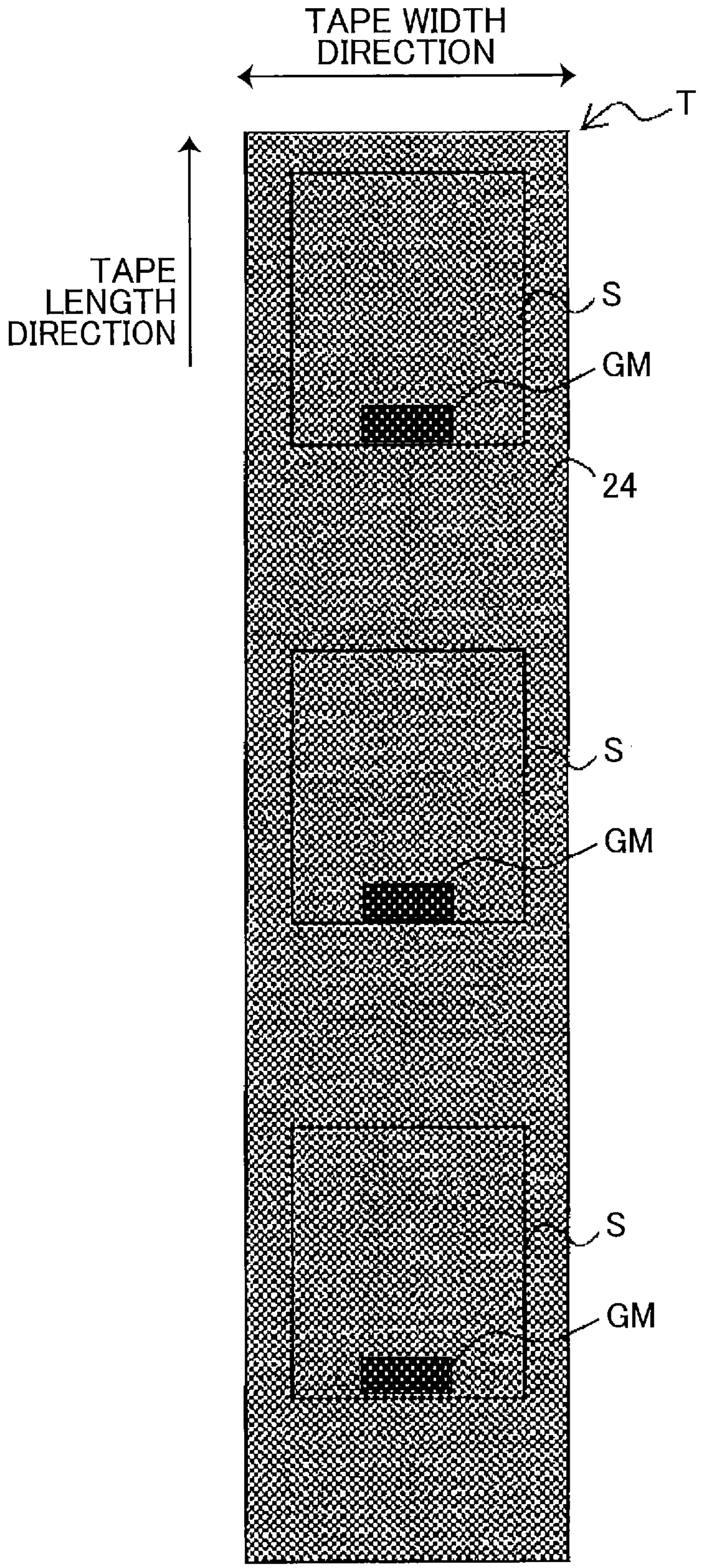
Figure 15D:
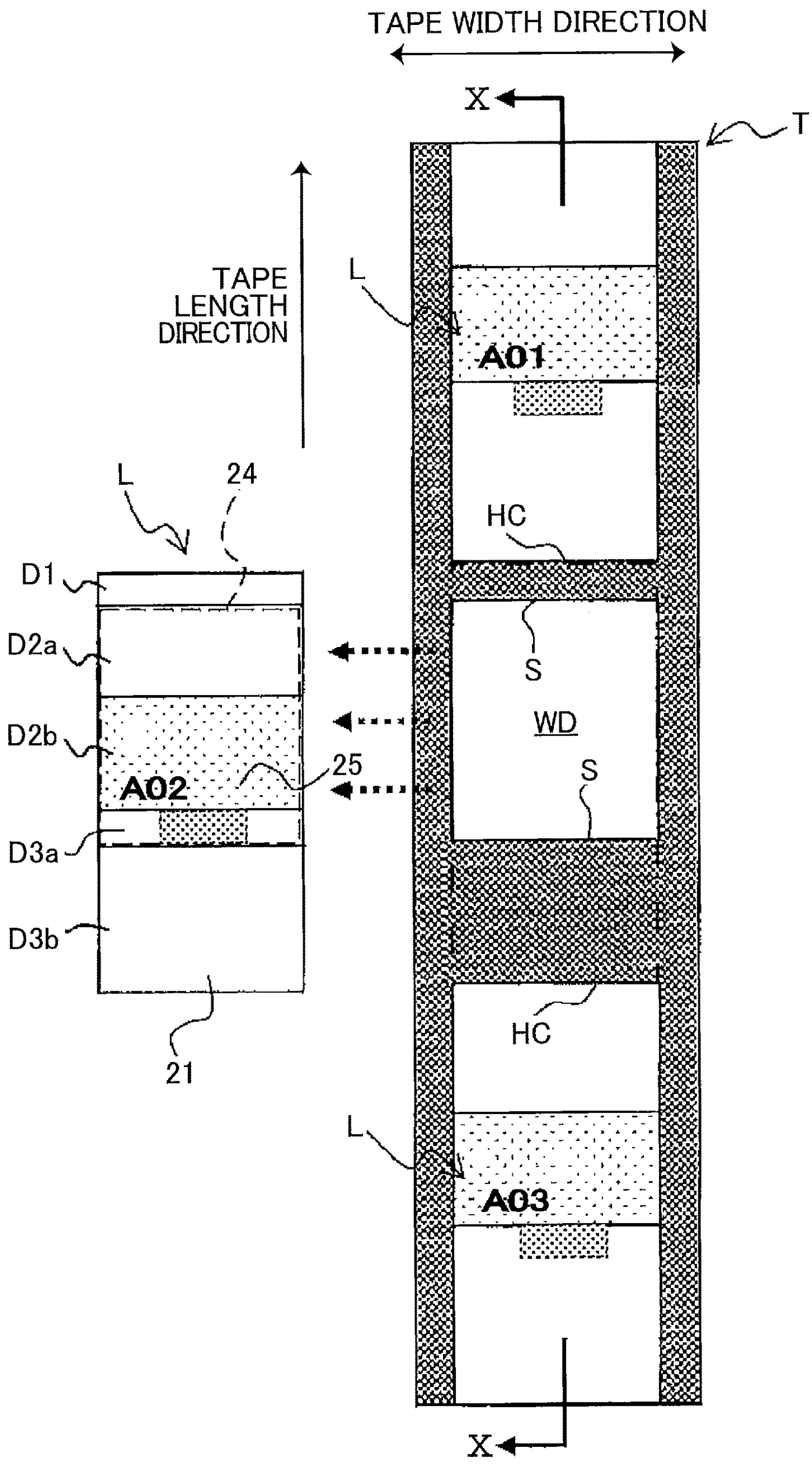
Figure 15E:
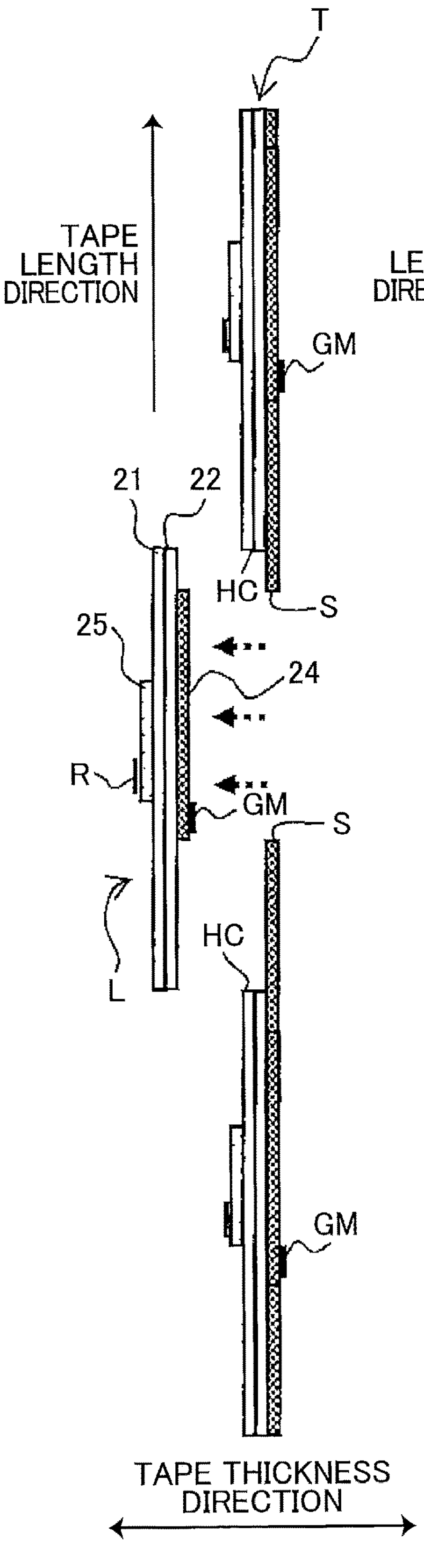
Figure 15F:
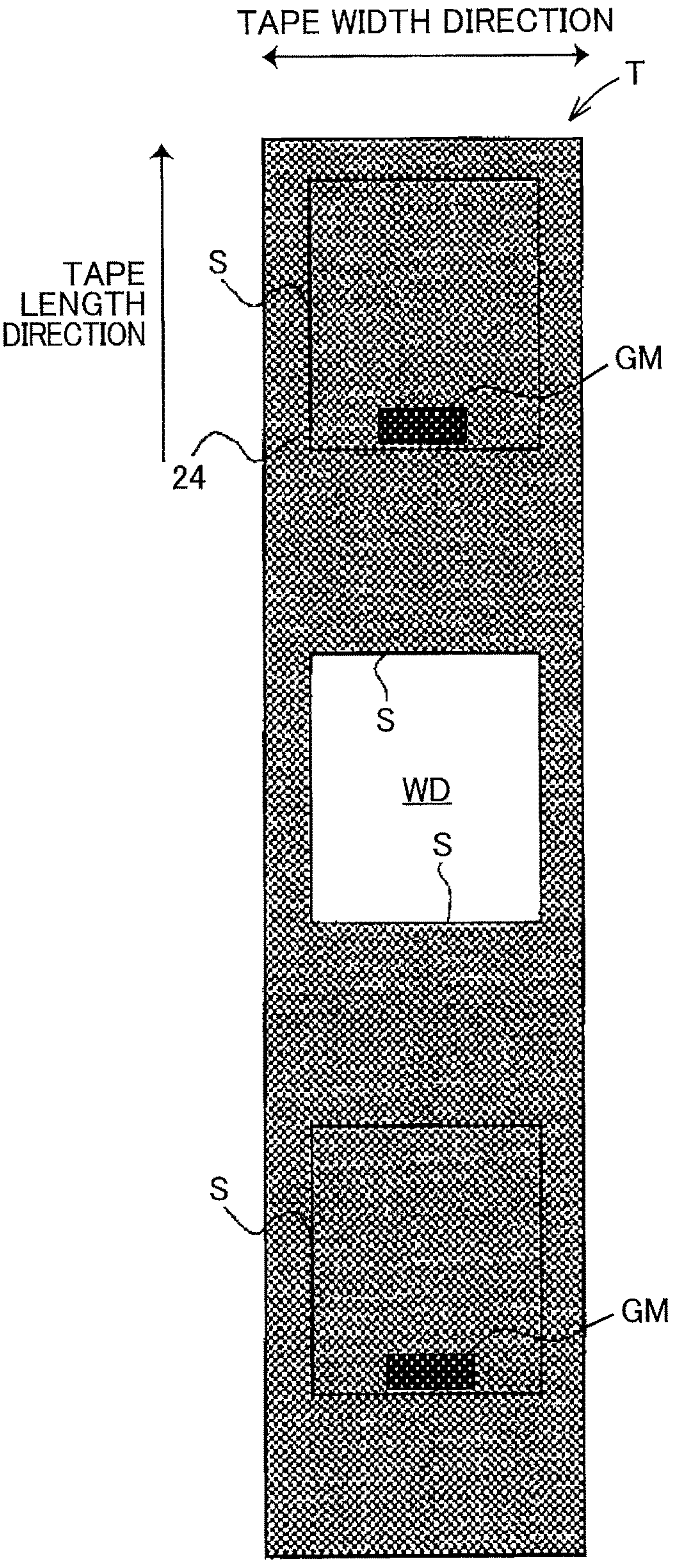

In the embodiment described above, the label L has a mark GM for alignment when wrapping the label L around the adherend 302, and a separate mark PM for positioning when conveying the printing tape To, but the present disclosure is not limited to this example. The mark GM may also take on the positioning function of the mark PM. FIGS. 15A through 15F show the process of separating alabel L from a printing tape T after printing according to this variation. FIG. 15A is a plan view showing the printed printing tape. FIG. 15B is a cross-sectional view of the structure in FIG. 15A taken along the section IX-IX. FIG. 15C is a rear view showing the printed printing tape. FIG. 15D is a plan view showing a single label that has been peeled off the printed printing tape. FIG. 15E is a cross-sectional view of the structure shown in FIG. 15D taken along the section X-X. FIG. 15F is a rear view of the printing tape after the label has been peeled off. FIGS. 15A through 15F correspond to FIGS. 3A through 3F in the embodiment.

Unlike the label L in FIGS. 3A through 3F in which a mark GM and a mark PM are arranged, a mark GM alone is arranged in the label L according to this variation, as shown in FIGS. 15A through 15F. Here, the mark GM is formed with the same shape, format, and the like as the mark PM according to the embodiment so that the positioning mechanism of the label-creating device 1 can recognize or detect the mark GM. Accordingly, the mark GM can serve as the positioning mark PM during conveyance in order to execute a print on the printing surface 25. Hence, with the labels L according to the present variation, when the tape cartridge 10 accommodating the printing tape To to be used for creating the labels L is mounted in the label-creating device 1, positioning marks PM do not need to be provided separately for positioning during conveyance when printing on the printing surfaces 25.

<Fifth Variation>

Figure 16B:
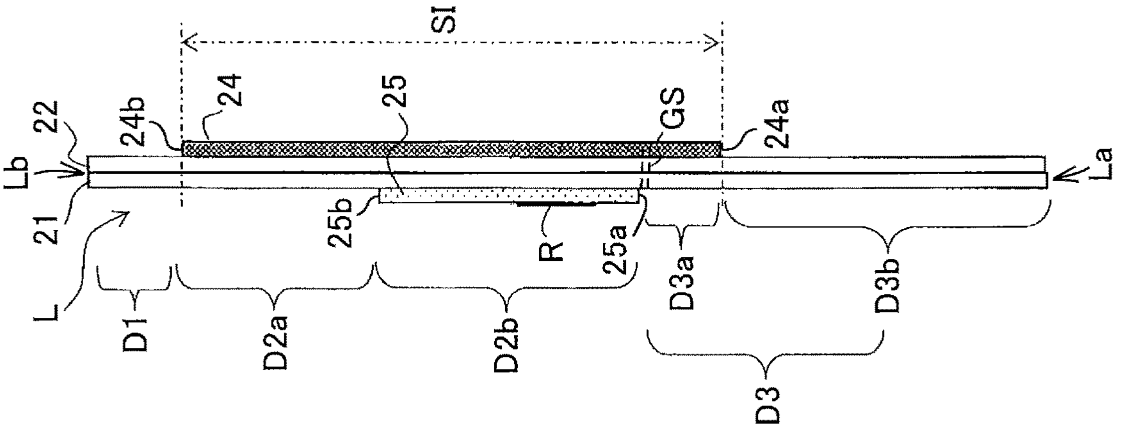
Figure 16A:
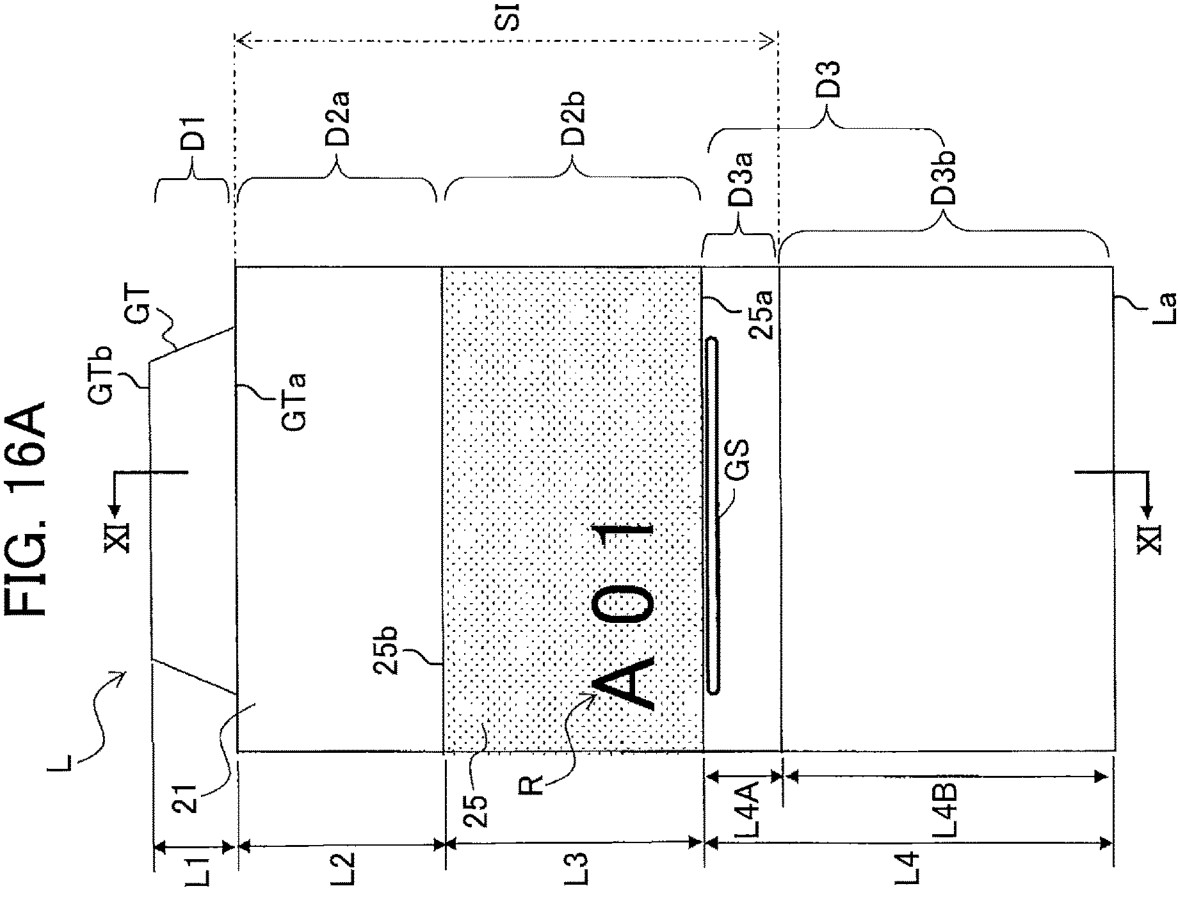
Figure 17A:
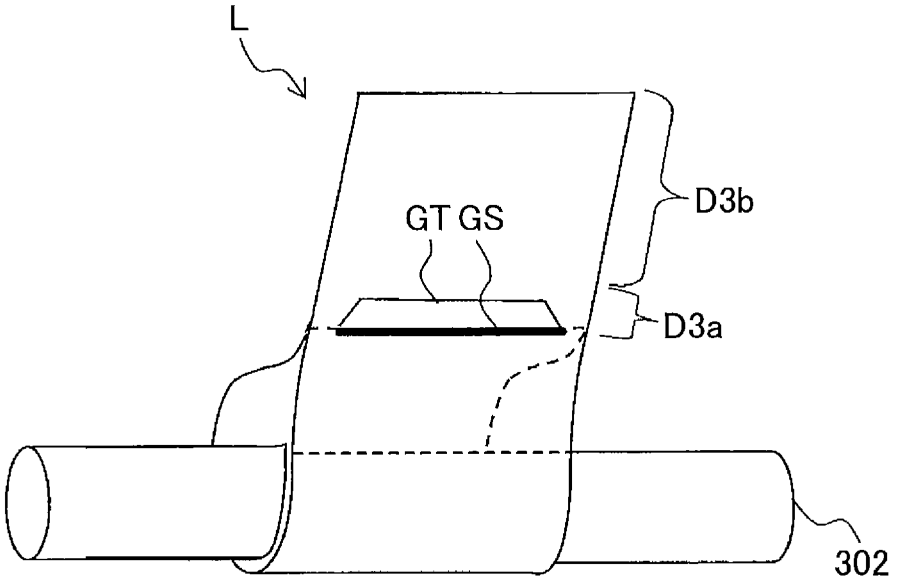
Figure 17B:
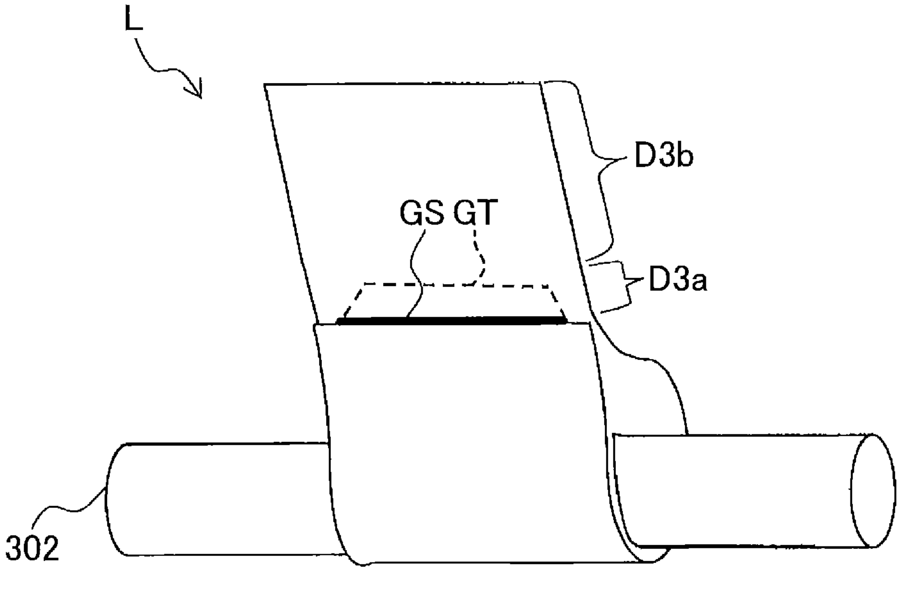

While labels L in the embodiment described above have marks GM for alignment, the present disclosure is not limited to this example. For example, the label L may have a special shape for alignment. FIGS. 15A through 15F and FIGS. 16A and 16B show an example of this special shape. FIGS. 16A and 16B show a detailed structure of the label L according to the fifth variation after being separated from the printing tape T. FIG. 16A is a plan view of a single label L. FIG. 16B is a cross-sectional view of the structure in FIG. 16A taken along the section XI-XI. FIGS. 17A and 17B are schematic perspective views showing the label L formed into a loop shape around the adherend 302 through the second step. FIGS. 16A and 16B correspond to FIGS. 4A and 4B in the embodiment, and FIGS. 17A and 17B correspond to FIGS. 6A and 6B in the embodiment.

As shown in FIG. 16A, the label L according to the present variation has a guide slit GS and a guide tab GT as an example of the special shape for alignment in place of the mark GM.

The guide slit GS is an example of the cut-out part and is used for alignment together with the guide tab GT described later when bonding together two exposed sections of the adhesive layer 22 or an exposed section of the adhesive layer 22 and the release material 24 in order to form the label L into a loop shape. Accordingly, the guide slit GS is provided at a position for forming the label into a loop shape having an inner diameter greater than the prescribed diameter. As shown in FIGS. 16A and 16B, the guide slit GS is formed in a slit shape arranged longitudinally in the tape width direction. The guide slit GS penetrates the release material 24, adhesive layer 22, and base material 21. In the present variation, the guide slit GS is separated a prescribed distance from the bottom edge 24$a$ toward the top edge 24$b$ of the release material 24 after the label L is formed and provided below the bottom edge 25$a$ of the printing surface 25, i.e., in the non-adhesive area D3$a$, as illustrated in FIG. 16B. The guide slit GS is preferably provided in the non-adhesive area D3$a$ at a position near the bottom edge 25$a$ of the printing surface 25. In this example, the guide slit GS is formed as a through-hole, but the guide slit GS may be formed as a slit having a prescribed depth sufficient for inserting the guide tab GT described later.

The guide tab GT is an example of the insertion part and is inserted into the guide slit GS described above when forming the label L into a loop shape. Accordingly, the guide tab GT is provided on the upper edge Lb of the label L. More specifically, the guide tab GT is provided in the adhesive area D1, as shown in FIG. 16A. In order to be insertable into the guide slit GS, the guide tab GT is formed in a position corresponding to the guide slit GS in the tape width direction and has a length equal to or smaller than the length of the guide slit GS in the tape width direction. Further, since the top edge GTb of the guide tab GT shown in FIG. 16A is to be inserted into the guide slit GS, the guide tab GT is preferably shaped so that its length in the tape width direction increases downward from the top edge Lb of the label L, as shown in FIG. 16A, in order to facilitate insertion. In the present variation, the length of the top edge GTb of the guide tab GT is smaller than the length of the bottom edge GTa of the guide tab GT in the tape width direction, as shown in FIG. 16A.

Figure 6A:
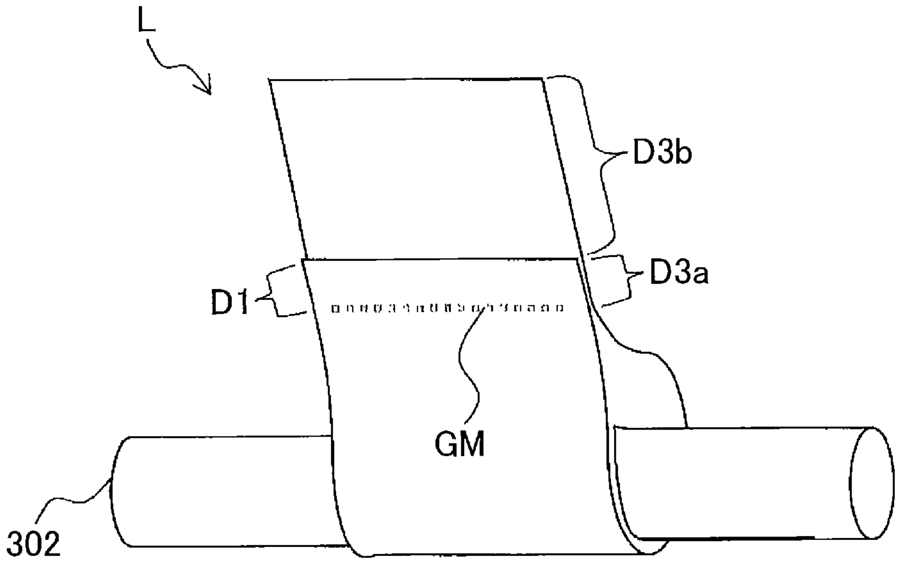
Figure 6B:
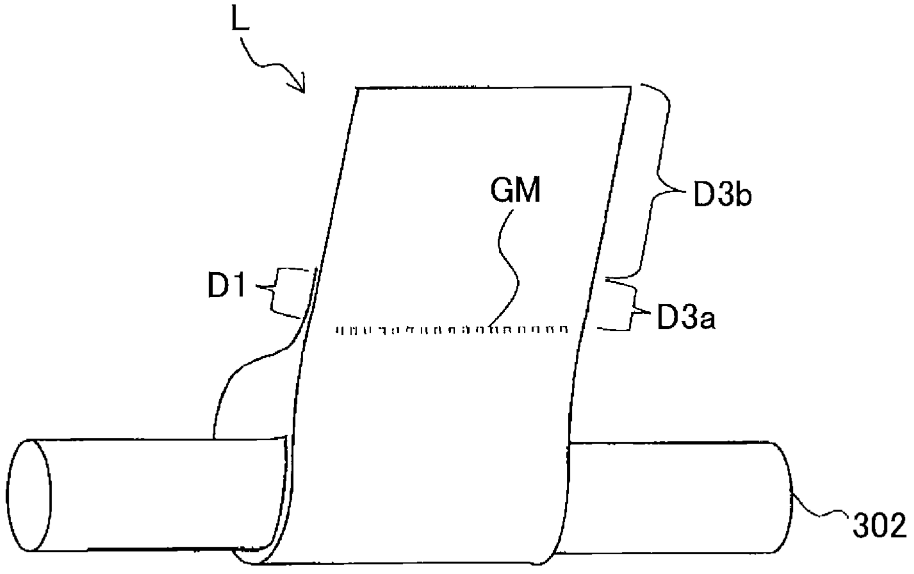

When bending the label L into a concave shape with the release material 24 on the inside in the second step of the method of printing and attaching the label L, the label L in the embodiment is positioned by aligning the top edge 24$b$ of the release material 24 with the mark GM, as shown in FIG. 6A and other drawings. However, the label L in this variation is positioned by inserting the guide tab GT into the guide slit GS from the back side (the side of the release material 24), as shown in FIG. 17A. Thus, the guide tab GT is inserted into the guide slit GS formed in the non-adhesive area D3$a$ from the near side shown in FIG. 17B (the side with the release material 24) toward the far side (the side with the base material 21). Other than this alignment method, the method for printing the label L is identical to that in the embodiment and will not be described here.

According to the label L of the present variation described above, even users unfamiliar with the operation can always form a gap between the adherend 302 and the label L by aligning the guide slit GS and guide tab GT constituting the special shape to form the loop shape described above. Hence, at the stage of forming this loop shape, the label L does not become too tight around the adherend 302. Since the release material 24 having a higher stiffness than the base material 21 must be subsequently folded over when wrapping the free portion of the label L protruding out from the loop-shaped portion so as to cover the printing surface of the base material 21, the label L is prevented from being wrapped too tightly around the adherend 302. When the label L is ultimately attached to the adherend 302 as a result of the above operations, the label L is prevented from becoming difficult to rotate relative to the adherend 302. Further, by forming the loop shape while aligning the guide slit GS and the guide tab GT, a gap can always be produced between the adherend 302 and the label L.

<Other>

When descriptions such as "perpendicular," "parallel," and "flat" appear in the above description, these descriptions are not intended to be taken in their strictest sense. In other words, "perpendicular," "parallel," and "flat" may signify "substantially perpendicular," "substantially parallel," and "substantially flat" to allow for design and manufacturing tolerances and error.

When dimensions and sizes are described as being "identical," "equivalent," "different," and the like in appearance in the above description, these terms are not intended to be taken in their strictest sense. In other words, the terms "identical," "equivalent," and "different" may signify "substantially identical," "substantially equivalent," and "substantially different" to allow for design and manufacturing tolerances and error.

In addition to what has already been described, the methods according to the above-described embodiment and the variations thereof may be used in suitable combinations.

In addition, although not illustrated individually, the present disclosure may be implemented with various modifications without departing from the spirit of the disclosure.

What is claimed is:

1. A label to be wrapped around an adherend after being printed, the adherend having a diameter equal to or smaller than a prescribed diameter, the label comprising:

a base material having a printing surface;

an adhesive layer provided on an opposite side surface of the base material from the printing surface;

a release material bonded to the adhesive layer with a portion of the adhesive layer exposed, so as to provide an exposed portion of the adhesive layer, the release material having a higher stiffness than the base material, the exposed portion of the adhesive layer being provided by the release material being non-coextensive with the adhesive layer in at least one area of the adhesive layer; and a mark for alignment to be used when bonding together exposed sections of the adhesive layer or an exposed section of the adhesive layer with the release material in order to form the label into a loop shape, wherein the mark is provided at a position for forming the label in the loop shape having an inner diameter greater than the prescribed diameter, and the release material is bonded to the adhesive layer on a first side of the release material, and the mark is disposed on the release material on a second side of the release material that opposes the first side of the release material, such that the mark is on a same side of the label as the exposed portion of the adhesive layer.

2. The label according to claim 1, wherein the mark is provided at a position for bonding the exposed section of the adhesive layer with the release material.

3. The label according to claim 1, wherein the label is packaged in a packaging material, and wherein the prescribed diameter is a recommended maximum diameter noted on the packaging material, on a packing box in which the packaging material is included, or in an instruction manual included in the packing box together with the packaging material.

4. The label according to claim 1, wherein the mark serves as a positioning mark during conveyance in order to execute a print on the printing surface.

5. The label according to claim 1, wherein the base material and the adhesive layer are provided with a transparent or semitransparent color.

6. The label according to claim 1, wherein the base material is provided with a hole or a series of holes.

7. A label to be wrapped around an adherend after being printed, the adherend having a diameter equal to or smaller than a prescribed diameter, the label comprising:

a base material having a printing surface;

an adhesive layer provided on an opposite side surface of the base material from the printing surface;

a release material bonded to the adhesive layer with a portion of the adhesive layer exposed, the release material having a higher stiffness than the base material; and a special shape for alignment to be used when bonding together exposed sections of the adhesive layer or an exposed section of the adhesive layer with the release material in order to form the label into a loop shape, wherein the special shape is provided at a position for forming the label in the loop shape having an inner diameter greater than the prescribed diameter.

8. The label according to claim 7, wherein the special shape is a cut-out part having a prescribed depth or an insertion part to be inserted into the cut-out part.

9. A method of printing and attaching a label, the label including: a base material; an adhesive layer provided on a first surface of the base material; and a release material bonded, on a first side of the release material, to the adhesive layer with a portion of the adhesive layer exposed, the release material having a higher stiffness than the base material, the label including a mark provided on a second side, of the release material, which opposes the first side of the release material, the method comprising:

a first step to print a second surface of the base material;

a second step to wrap the label around an adherend and to bond together exposed sections of the adhesive layer or an exposed section of the adhesive layer with the release material to form the label into a loop shape while leaving a gap between the label and the adherend, the second step being performed after the first step; and a third step to fold over the release material and to lay a protruding portion of the label protruding out from a loop-shaped portion over the second surface of the base material while reducing the gap between the label and the adherend, the third step being performed after the second step.

10. The label according to claim 7, wherein the special shape is provided at a position for bonding the exposed section of the adhesive layer with the release material.

11. The label according to claim 1, wherein the exposed portion of the adhesive layer includes:

a first exposed portion at a first end of the label; and a second exposed portion at a second end of the label.

12. The label according to claim 11, wherein:

the first exposed portion is larger in area than the second exposed portion; and the mark, disposed on the release material, is closer to the first exposed portion than to the second exposed portion.

* * * * *